United States Patent
Yokouchi et al.

(10) Patent No.: US 12,311,533 B2
(45) Date of Patent: May 27, 2025

(54) COOKING-CONTAINER-HOLDING UNIT AND AUTOMATIC COOKING-CONTAINER-CONVEYING DEVICE INCORPORATING SAME

(71) Applicant: TECHMAGIC INC., Tokyo (JP)

(72) Inventors: Kohei Yokouchi, Tokyo (JP); Naoto Watanabe, Tokyo (JP); Ryosuke Tajima, Tokyo (JP)

(73) Assignee: TECHMAGIC INC., Tokyo (JP)

( * ) Notice: Subject to any disclaimer, the term of this patent is extended or adjusted under 35 U.S.C. 154(b) by 0 days.

(21) Appl. No.: 18/626,347

(22) Filed: Apr. 4, 2024

(65) Prior Publication Data

US 2024/0246244 A1 Jul. 25, 2024

Related U.S. Application Data

(63) Continuation of application No. PCT/JP2022/034536, filed on Sep. 15, 2022.

(30) Foreign Application Priority Data

Oct. 8, 2021 (JP) ................. 2021-166455

(51) Int. Cl.
*B25J 15/00* (2006.01)
*B25J 11/00* (2006.01)

(52) U.S. Cl.
CPC ....... *B25J 15/0038* (2013.01); *B25J 11/0045* (2013.01)

(58) Field of Classification Search
CPC ...... A47B 77/08; B25J 11/0045; B25J 19/023
See application file for complete search history.

(56) References Cited

U.S. PATENT DOCUMENTS

| | | | | |
|---|---|---|---|---|
| 4,505,194 A | * | 3/1985 | Bishop | A47J 37/1228 99/344 |
| 5,147,068 A | * | 9/1992 | Wright | H05B 6/808 221/9 |
| 2004/0172380 A1 | | 9/2004 | Zhang et al. | |

(Continued)

FOREIGN PATENT DOCUMENTS

| | | |
|---|---|---|
| JP | S35019558 Y | 8/1960 |
| JP | S63060588 U | 4/1988 |

(Continued)

*Primary Examiner* — Saul Rodriguez
*Assistant Examiner* — Brendan P Tighe
(74) *Attorney, Agent, or Firm* — HAUPTMAN HAM, LLP

(57) ABSTRACT

A cooking-container-holding unit includes a pair of upper and lower container-holding parts that sandwich an annular circumferential wall portion of a cooking container, which has a container body and the annular circumferential wall portion that is concentric with the container body and extends at least in one of an upward direction and a downward direction from a flange part, which is provided on a container outer circumferential surface; a holding drive part configured to detachably hold the cooking container in a cantilever manner with the pair of upper and lower container-holding parts; and a container displacement drive part configured to displace the cooking container. Part of at least one of the pair of upper and lower container-holding parts freely abuts against the container outer circumferential surface of the cooking container.

12 Claims, 11 Drawing Sheets

(56) References Cited

U.S. PATENT DOCUMENTS

| | | |
|---|---|---|
| 2011/0133502 A1 | 6/2011 | Koyama et al. |
| 2012/0006826 A1 | 1/2012 | Mcintyre et al. |
| 2013/0099517 A1 | 4/2013 | Sato et al. |
| 2015/0056352 A1* | 2/2015 | Dogan ................ A47J 31/3628 426/431 |
| 2015/0139766 A1* | 5/2015 | Cousins ................ B25J 9/1679 414/812 |
| 2015/0190929 A1* | 7/2015 | Matsuoka ................ B25J 15/08 294/119.1 |
| 2017/0172350 A1* | 6/2017 | Farid ........................ A47J 44/00 |
| 2021/0268648 A1* | 9/2021 | Park ...................... B25J 15/0066 |
| 2021/0321813 A1 | 10/2021 | Shiraki |
| 2022/0031122 A1* | 2/2022 | He ........................... A47J 44/00 |
| 2022/0031123 A1* | 2/2022 | He ........................... H05B 6/745 |
| 2022/0369845 A1* | 11/2022 | Bisbis .................... A47J 31/007 |
| 2022/0369854 A1* | 11/2022 | Bisbis ..................... B25J 15/08 |
| 2023/0405834 A1* | 12/2023 | Pashut .................... A47B 77/08 |
| 2024/0076179 A1* | 3/2024 | Dirik .................... B25J 15/0616 |
| 2024/0341538 A1* | 10/2024 | Ishiwata ................. A47J 27/14 |
| 2025/0011153 A1* | 1/2025 | Dirik .................... B25J 11/0045 |

FOREIGN PATENT DOCUMENTS

| | | |
|---|---|---|
| JP | S64067500 A | 3/1989 |
| JP | H06170772 A | 6/1994 |
| JP | H07033590 U | 6/1995 |
| JP | H08150589 A | 6/1996 |
| JP | H10235588 A | 9/1998 |
| JP | 2005504259 A | 2/2005 |
| JP | 2012000724 A | 1/2012 |
| JP | 2020518517 A | 6/2020 |
| KR | 1020120096135 A | 8/2012 |
| WO | 2010029595 A1 | 3/2010 |
| WO | 2018085796 A1 | 5/2018 |
| WO | 2019090352 A1 | 5/2019 |
| WO | 2020166723 A2 | 8/2020 |

* cited by examiner

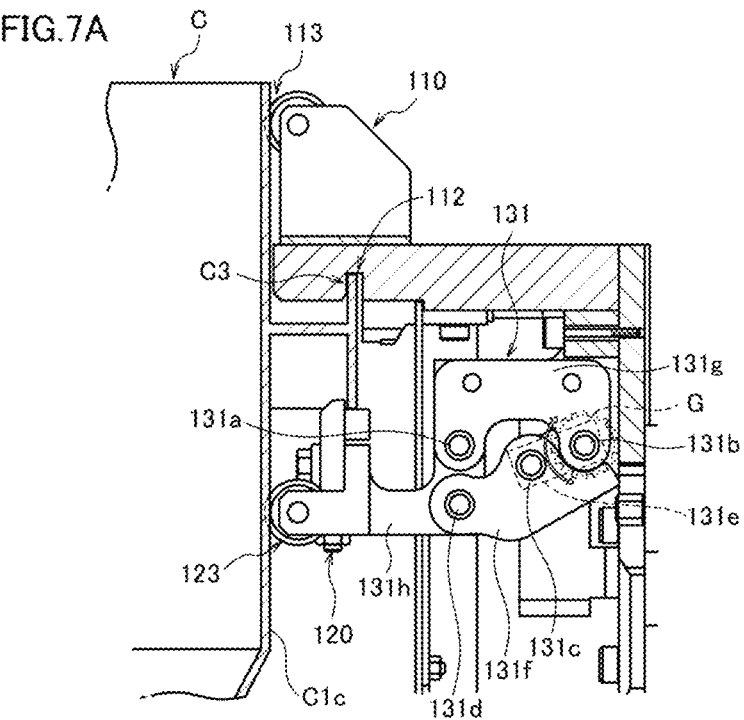
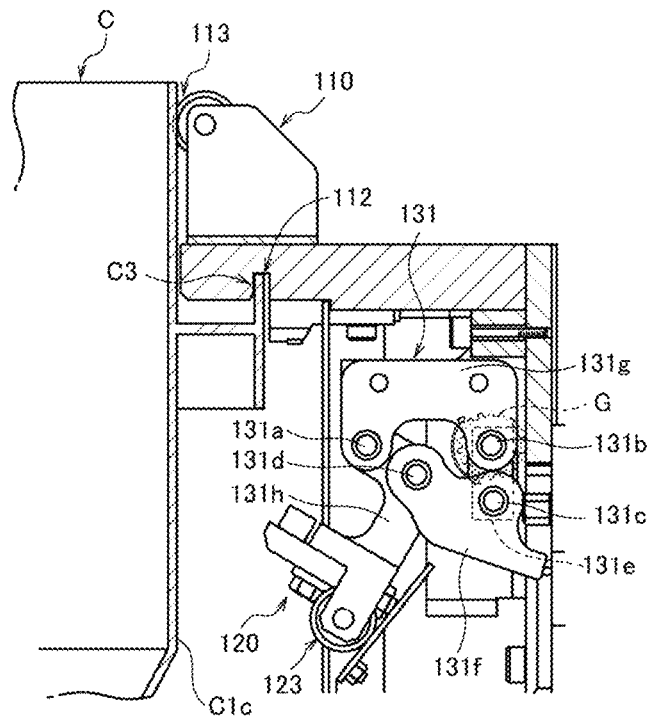

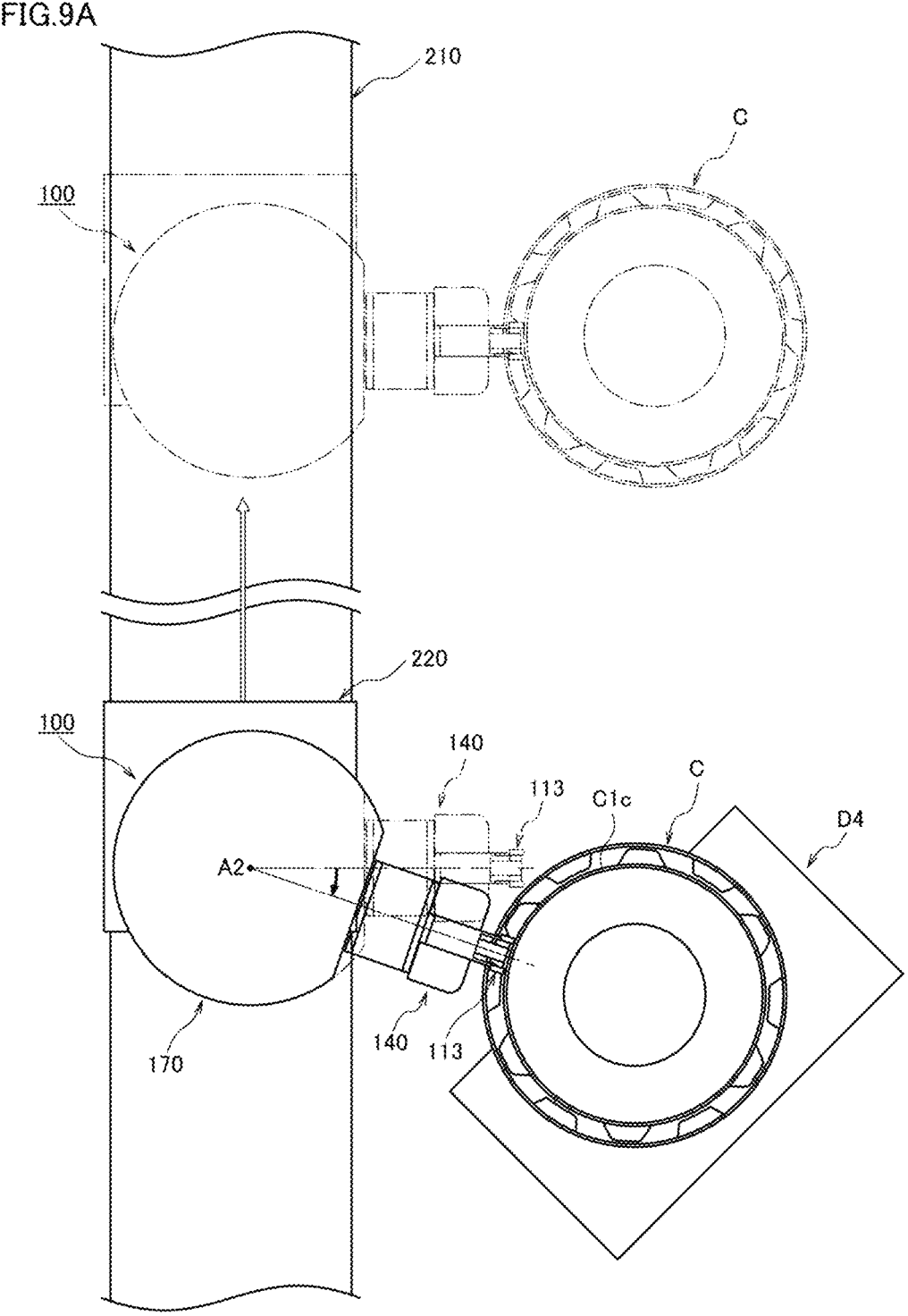

FIG.10
(A)
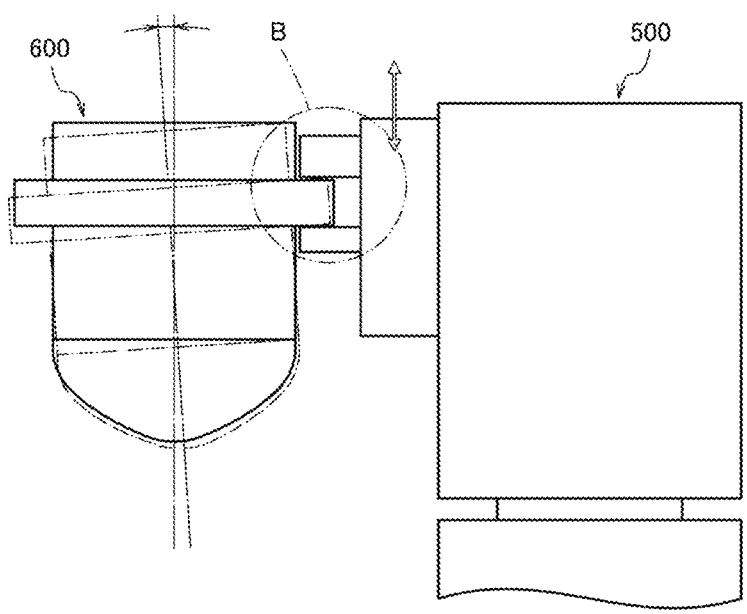
(B)
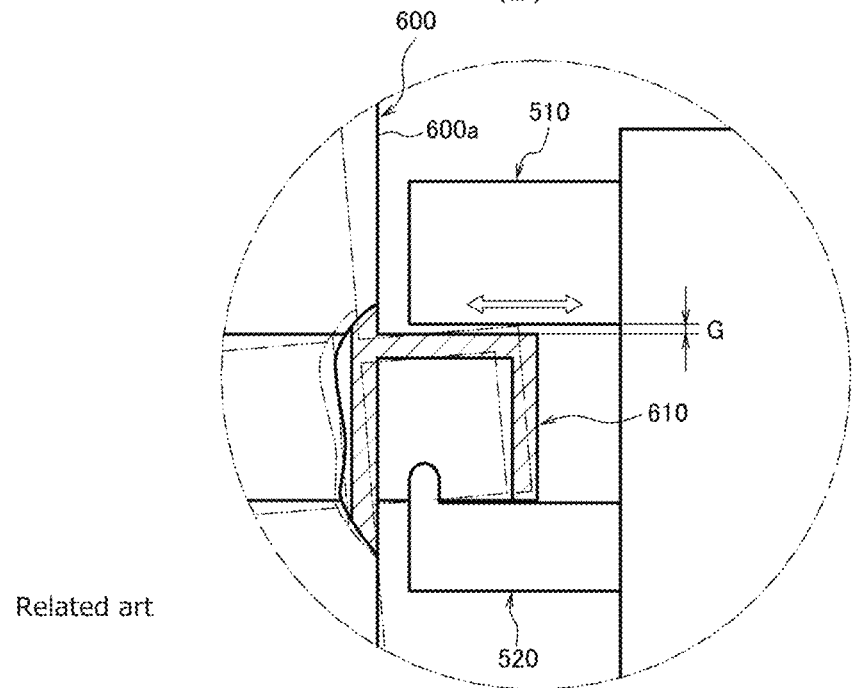
Related art

COOKING-CONTAINER-HOLDING UNIT AND AUTOMATIC COOKING-CONTAINER-CONVEYING DEVICE INCORPORATING SAME

RELATED APPLICATIONS

The present application is a continuation application of International Application Number PCT/JP2022/034536 filed Sep. 15, 2022, which claims the benefit of priority to Japanese Patent Application No. 2021-166455, filed on Oct. 8, 2021, the disclosures of which applications are hereby incorporated by reference herein in their entirety.

TECHNICAL FIELD

The present invention relates to a cooking-container-holding unit that displaces the holding orientation of a cooking container in accordance with various cooking operations, and an automatic cooking-container-conveying device incorporating the same.

BACKGROUND ART

In recent years, there has been a demand for automating cooking processes, this demand arising from circumstances such as a shortage of manpower at restaurants. Accordingly, various cooking devices that automate a part of the cooking process and automatic food-serving systems that integrate and automate these devices are under development.

Such an automatic food-serving system includes, for example, a noodle supply device, a boiler, a washing machine, a heating cooking device, a cooking container waiting part, a food material supply device, and a dishing-up device. Such an automatic food-serving system also includes a cooking-container-holding device that detachably grips a cooking container, freely adjusts a gripping orientation of the gripped cooking container, and moves the gripped cooking container between the foregoing respective devices (see Patent Literature 1).

The cooking-container-holding device used in the automatic food-serving system is constituted of a pair of movable gripping claws that grip a part of a flange part having an L-shaped cross section that is provided on an outer circumference of a cooking container, and a position and orientation adjusting part that allows the pair of gripping claws to grip and release the cooking container and also adjusts the position and orientation of the cooking container while the cooking container is gripped. The cooking-container-holding device automatically travels to a plurality of conveyance positions such as a noodle supply device and a boiler as described above to convey the cooking container. Then, the cooking-container-holding device performs actions such as moving the cooking container up and down in accordance with various cooking operation at each conveyance position, or rotating the cooking container in a horizontal direction to move the cooking container to a position that fits the cooking operation.

CITATION LIST

Patent Literature

PTL 1: WO2020/166723 (in particular, see paragraph 0090, Embodiment 2, and FIG. 4 to FIG. 6)

SUMMARY OF INVENTION

Technical Problem

FIG. 10 illustrates a cooking-container-holding device of a conventional automatic food-serving system. As illustrated, a vertical gap G is provided between a pair of upper and lower gripping claws 510 and 520 and a flange part 610 of a cooking container 600 so that the flange part 610 of the cooking container 600 can be detachably gripped in a cantilever manner with the pair of upper and lower gripping claws 510 and 520. However, in the case of, for example, turning and moving the cooking container 600 in a horizontal plane to move the cooking container 600 from a food material supply device to a heating cooking device, or in the case of washing the cooking container 600 in a washing machine by reversing an opening part of the cooking container 600 upside down, the aforementioned vertical gap G causes rattling and an unstable gripping orientation of the cooking container 600, and also causes wear, damage or noise in a grip part region. Moreover, the vertical gap G makes it necessary to devise another way to prevent the cooking container 600 from dropping from the pair of upper and lower gripping claws 510 and 520. Thus, there was a problem with the vertical gap G in that it interferes with speeding up of the automatic food-serving system.

Accordingly, the present invention has been made in order to solve the problems of the conventional technology as described above. An object of the present invention is to provide a cooking-container-holding unit that achieves stable handling of a cooking container in a cooking process line by eliminating rattling of the cooking container that is likely to occur in cases such as when the vertical orientation of the cooking container held in a cantilever manner is reversed or when the cooking container is turned in a horizontal plane. Furthermore, another object thereof is to provide an automatic cooking-container-conveying device incorporating the same.

Solution to Problem

In order to solve the problems described above, a cooking-container-holding unit according to claim 1 is a cooking-container-holding unit configured to hold a cooking container, the cooling container having a cylindrical container body configured to receive a food material so that the food material is freely stored and an annular circumferential wall portion that is concentric with the container body and extends at least in one of an upward direction and a downward direction from a flange part, which is provided on a container outer circumferential surface of the container body. The cooking-container-holding unit includes: a pair of upper and lower container-holding parts that sandwich the annular circumferential wall portion of the cooking container; a holding drive part configured to detachably hold the cooking container in a cantilever manner with the pair of upper and lower container-holding parts; and a container displacement drive part configured to displace the cooking container held by the holding drive part in accordance with cooking operation. In this cooking-container-holding unit, part of at least one of the pair of upper and lower container-holding parts freely abuts against the container outer circumferential surface of the cooking container, one of the upper and lower container-holding parts includes a container fitting groove into which the annular circumferential wall portion of the cooking container is fitted in a loosely fitted state, and the other of the upper and lower container-holding parts includes a push-in piece configured to push the other side section of the annular circumferential wall portion of the cooking container toward the one side.

In the invention according to claim 2, in addition to the configuration of the cooking-container-holding unit according to claim 1, one of the upper and lower container-holding parts includes a container fitting groove into which the annular circumferential wall portion of the cooking container is fitted in a loosely fitted state, and at least either the one or the other of the upper and lower container-holding parts includes an outer-circumferential-surface-abutting member configured to abut against the container outer circumferential surface of the cooking container.

In the invention according to claim 3, in addition to the configuration of the cooking-container-holding unit according to claim 1, the container fitting groove of the container-holding part is constituted of an arc-shaped groove wall surface that is concentric with the annular circumferential wall portion of the cooking container.

In the invention according to claim 4, in addition to the configuration of the cooking-container-holding unit according to claim 1, the other of the upper and lower container-holding parts includes the outer-circumferential-surface-abutting member made of a roller configured to abut against the container outer circumferential surface of the cooking container, and a push-in piece configured to push a lower section of the annular circumferential wall portion of the cooking container upward from a lower side.

In the invention according to claim 5, in addition to the configuration of the cooking-container-holding unit according to claim 1, the holding drive part has a toggle mechanism that is coupled with the push-in piece to amplify a driving force from a drive source.

The invention according to claim 6 provides an automatic cooking-container-conveying device including: the cooking-container-holding unit according to claim 1; a transfer unit configured to transfer the cooking-container-holding unit; and a control unit configured to drive and control the cooking-container-holding unit and the transfer unit. In the automatic cooking-container-conveying device, the transfer unit is provided along a cooking process line.

Advantageous Effects of Invention

The present invention relates to a cooking-container-holding unit configured to hold a cooking container, the cooking container being constituted of a cylindrical container body configured to receive a food material so that the food material is freely stored and an annular circumferential wall portion that is concentric with the container body and extends at least in one of an upward direction and a downward direction from a flange part that is provided on a container outer circumferential surface of the container body. The cooking-container-holding unit includes: a pair of upper and lower container-holding parts that sandwich the annular circumferential wall portion of the cooking container and abut against the container outer circumferential surface of the cooking container; a holding drive part configured to detachably hold the cooking container in a cantilever manner with the pair of upper and lower container-holding parts; and a container displacement drive part configured to displace, in accordance with cooking operation, the cooking container held by the holding drive part. Accordingly, when the cooking container is held in a cantilever manner, the pair of upper and lower container-holding parts, operated by the holding drive part, abut against the annular circumferential wall portion of the cooking container and the container outer circumferential surface, which is separated from the annular circumferential wall portion in a vertical direction and in a container radial direction. As a result, the container-holding parts share an eccentric load caused by the weight of the cooking container itself. As compared with a conventional grip member, which grips in a cantilever manner by supporting the entire weight of the cooking container with only the annular circumferential wall portion of the cooking container, the cooking container is positioned and held more reliably with the annular circumferential wall portion and the container outer circumferential surface of the cooking container. Accordingly, it is possible to suppress rattling in terms of vertical orientation of the cooking container. Such rattling is likely to occur, for example, in a washing process because of the cooking container being displaced when the vertical orientation of the cooking container is reversed around a shaft center of the cooking container in a cantilever state and the bottom of the container is on the upper side. By suppressing this rattling, stable displacement operation of the cooking container can be implemented. This effect makes it possible to reduce the time required for vertical reversing operation, turning operation, and lifting-lowering operation of the cooking container and also to achieve handling of the cooking container with high cooking efficiency.

The cooking-container-holding unit of the present invention also includes: a holding drive part configured to detachably hold the cooking container in a cantilever manner with the pair of upper and lower container-holding parts; and a container displacement drive part configured to displace, in accordance with cooking operation, the cooking container held by the holding drive part. Accordingly, since it becomes possible to downsize drive sources of the holding drive part and the container displacement drive part and to dispose the drive sources to be separate, space saving for the cooking-container-holding unit can be achieved, and the range of displacing the cooking container can be expanded.

In the cooking-container-holding unit of the invention according to claim 2, having the advantageous effects demonstrated by the cooking-container-holding unit according to claim 1, one of the upper and lower container-holding parts includes a container fitting groove in which the annular circumferential wall portion of the cooking container is fitted in a loosely fitted state, and at least either the one or the other of the upper and lower container-holding parts includes an outer-circumferential-surface-abutting member configured to abut against the container outer circumferential surface of the cooking container. Accordingly, when the annular circumferential wall portion of the cooking container is fitted into the container fitting groove in one of the container-holding part, and the outer-circumferential-surface-abutting member of at least either the one or the other of the container-holding parts is pressed to the container outer circumferential surface of the cooking container, a so-called three-point support state is achieved in which, for example, the annular circumferential wall portion of the cooking container leans against a pair of groove wall surfaces that form the inside of the container fitting groove and obliquely abut against the respective groove wall surfaces at two points, and also the container outer circumferential surface of the cooking container abuts against the outer-circumferential-surface-abutting member. Therefore, when the cooking container is held with the pair of upper and lower container-holding parts, it is possible to keep a cantilever state where the annular circumferential wall portion and the container outer circumferential surface of the cooking container are reliably positioned and engaged.

Moreover, one of the pair of upper and lower container-holding parts includes the container fitting groove into which the annular circumferential wall portion of the cooking container is fitted in a loosely fitted state. Therefore, when the cooking container is mounted on the cooking-container-holding unit, a gap required for mounting the container is ensured to allow the annular circumferential wall portion of the cooking container to be in the state of being loosely fitted into the container fitting groove of the container-holding part. As a result, it becomes easy to fit the annular circumferential wall portion of the cooking container into the container fitting groove, and it becomes possible to achieve simple mounting operation for the cooking container.

In the cooking-container-holding unit of the invention according to claim 3, having the advantageous effects demonstrated by the cooking-container-holding unit according to claim 2, the container fitting groove of the container-holding part is constituted of an arc-shaped groove wall surface that is concentric with the annular circumferential wall portion of the cooking container. Because of this arrangement, relative misalignment between the annular circumferential wall portion of the cooking container and the container fitting groove of the container-holding part is suppressed even if centrifugal force by the turning is generated by the annular circumferential wall portion of the cooking container being in surface contact with the container fitting groove of the container-holding part when the cooking container is displaced to turn in the horizontal plane in accordance with cooking operation. Therefore, when the cooking container is displaced so as to turn in the horizontal plane in accordance with the cooking operation, the rattling of the cooking container in the turning direction in the container-holding part can be eliminated. Also, the operation speed required for the turning displacement during cooking can be further increased, while the rattling of the cooking container can be suppressed even with the turning speed increased.

In the cooking-container-holding unit of the invention according to claim 4, having the advantageous effects demonstrated by the cooking-container-holding unit according to claim 2 or 3, the other of the upper and lower container-holding parts includes the outer-circumferential-surface-abutting member made of a roller configured to abut against the container outer circumferential surface of the cooking container, and a push-in piece configured to push a lower section of the annular circumferential wall portion of the cooking container upward from a lower side. Because of this arrangement, when the cooking container is mounted on the cooking-container-holding unit, the push-in piece pushes the annular circumferential wall portion of the cooking container, which has been fitted into the container fitting groove of the container-holding part, upward from the lower side so as to prevent the annular circumferential wall portion from accidentally dropping from the container fitting groove of the container-holding part. Furthermore, the outer-circumferential-surface-abutting member made of a roller is smoothly pressed to the container outer circumferential surface of the cooking container. This effect allows the cooking-container-holding unit to reliably mount the cooking container thereon so as to prevent the cooking container from accidentally dropping from the container fitting groove of the container-holding part.

In the cooking-container-holding unit of the invention according to claim 5, having the advantageous effects demonstrated by the cooking-container-holding unit according to claim 4, the holding drive part has a toggle mechanism that is coupled with the push-in piece, so that the driving force from the drive source is amplified and transmitted to the lower-side container-holding part that is a movable side. Because of this arrangement, the driving force obtained from the drive source can be amplified to a large holding force by the pair of upper and lower container-holding parts. As a result, the size of a drive source, such as a motor, can be reduced and the device can be downsized.

In the automatic cooking-container-conveying device of the invention according to claim 6, the automatic cooking-container-conveying device includes: the cooking-container-holding unit according to any one of claims 1 to 5; a transfer unit configured to transfer the cooking-container-holding unit; and a control unit configured to drive and control the cooking-container-holding unit and the transfer unit. Here, the transfer unit is provided along a cooking process line. Accordingly, the cooking-container-holding unit abuts against the annular circumferential wall portion and the container outer circumferential surface of the cooking container to share an eccentric load due to the weight of the cooking container itself and to hold the cooking container in a cantilever manner. For example, in the washing process, the vertical orientation of the cooking container is reversed around a shaft center of the cooking container in a cantilever state so that the bottom of the container is on the upper side, and in a heating cooking process, the cooking container is turned in the horizontal plane from the food material supply device to the heating cooking device or lifted and lowered in a vertical direction, so that the transfer unit, which is driven and controlled by the control unit, efficiently transfers the cooking-container-holding unit to various cooking positions arranged along the cooking process line. Therefore, rattling of the cooking container, which is likely to occur when the vertical orientation of the cooking container is reversed or when the cooking container is turned in the horizontal plane, can be eliminated, while considerable reduction of the time required for vertical reversing operation, turning operation, and lifting-lowering operation of the cooking container can be achieved. Moreover, in the cooking process line constituted of, for example, a noodle supply device, a boiler, a washing machine, a heating cooking device, a cooking container waiting part, a food material supply device, and a dishing-up device, quick and stable handling of the cooking container, this handling being that generally regarded as a user-friendly handling of the cooking container, can be achieved, and a layout design with high cooking efficiency can be achieved.

BRIEF DESCRIPTION OF DRAWINGS

FIG. 7A is an explanatory view of the operation of a toggle mechanism used in the cooking-container-holding unit.

FIG. 7B is an explanatory view of the operation of the toggle mechanism used in the cooking-container-holding unit.

FIG. 9A is an explanatory view of an operation when a cooking container is mounted on the cooking-container-holding unit.

FIG. 10 is a diagram illustrating a gripping state of a cooking container by a conventional cooking-container-holding apparatus.

DESCRIPTION OF EMBODIMENTS

Figure 1:
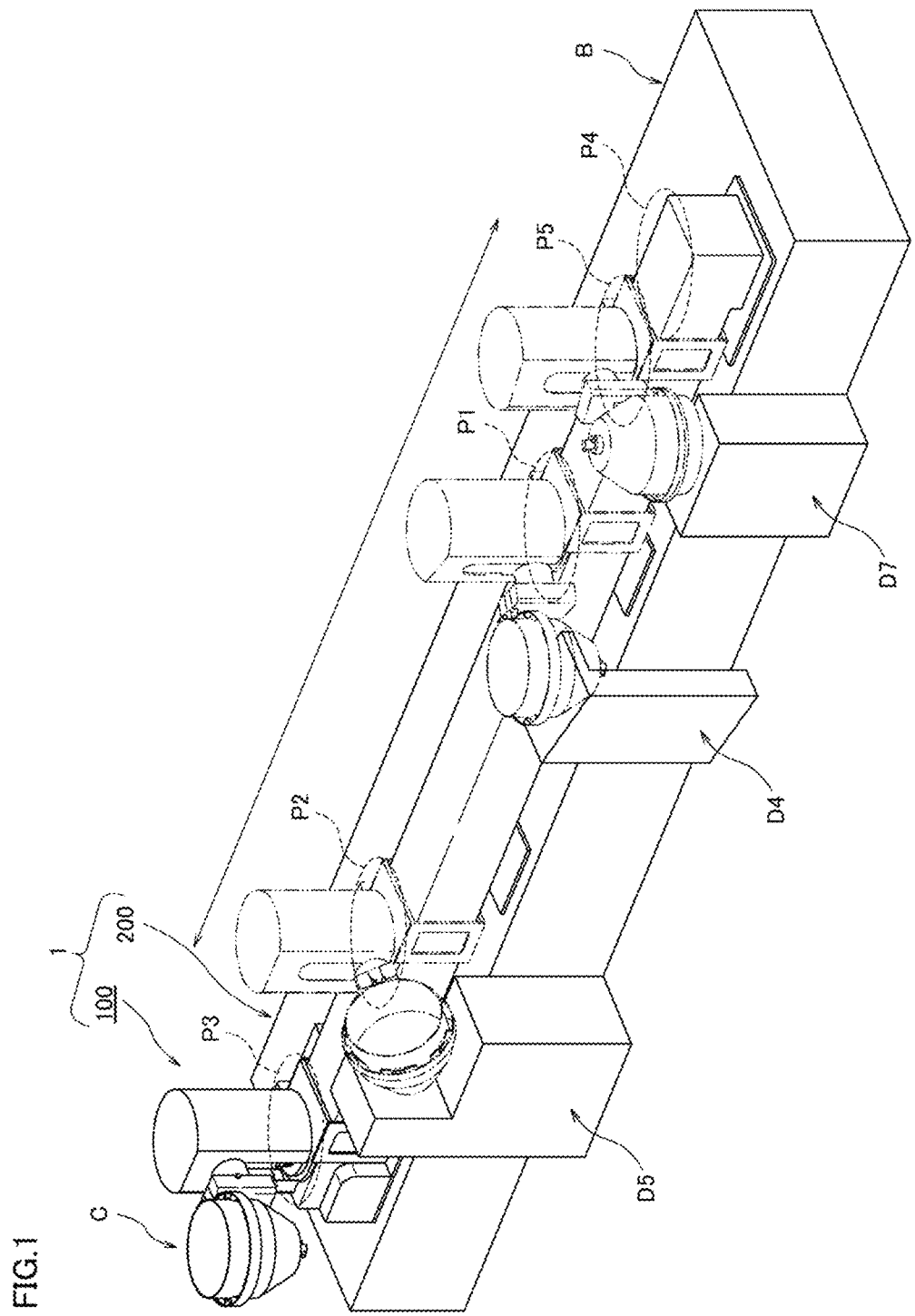
FIG. 1 is a perspective view showing a use aspect of an automatic cooking-container-conveying device as an embodiment of the present invention.

A cooking-container-holding unit and an automatic cooking-container-conveying device according to embodiments of the present invention will be described below with reference to the accompanying drawings. It is to be noted that the embodiments shown below illustrate the cooking-container-holding unit and the automatic cooking-container-conveying device for embodying the technical concept of the present invention and are not intended to limit the present invention. Therefore, the technical concept of the present invention is equally applicable to other embodiments within the scope of claims.

The cooking-container-holding unit of the present invention is a cooking-container-holding unit configured to hold a cooking container, the cooking container being constituted of a cylindrical container body configured to receive a food material so that the food material is freely stored and an annular circumferential wall portion that is concentric with the container body and extends at least in one of an upward direction and a downward direction from a flange part, which is provided on a container outer circumferential surface of the container body. The cooking-container-holding unit includes: a pair of upper and lower container-holding parts that sandwich the annular circumferential wall portion of the cooking container and abut against the container outer circumferential surface of the cooking container; a holding drive part configured to detachably hold the cooking container in a cantilever manner with the pair of upper and lower container-holding parts; and a container displacement drive part configured to displace, in accordance with the cooking operation, the cooking container held by the holding drive part. The specific embodiment thereof may be any embodiments as long as rattling of the cooking container, which is likely to occur when the vertical orientation of the cooking container is reversed or when the cooking container is turned in the horizontal plane, can be eliminated to achieve stable handling of the cooking container in the cooking process line, and also the time required for vertical reversing operation, turning operation, and lifting-lowering operation of the cooking container can be shortened to achieve handling of the cooking container with high cooking efficiency.

The automatic cooking-container-conveying device of the present invention includes: the cooking-container-holding unit described above; a transfer unit configured to transfer the cooking-container-holding unit; and a control unit configured to drive and control the cooking-container-holding unit and the transfer unit. The specific embodiment thereof may be any embodiments as long as the transfer unit is provided along the cooking process line, rattling of the cooking container, which is likely to occur when the vertical orientation of the cooking container is reversed or when the cooking container is turned in the horizontal plane, are eliminated, while considerable reduction of the time required for vertical reversing operation, turning operation, and lifting-lowering operation of the cooking container is achieved. In the cooking process line constituted of, for example, a noodle supply device, a boiler, a washing machine, a heating cooking device, a cooking container waiting part, a food material supply device, and a dishing-up device, quick and stable handling of the cooking container, this handling being that generally regarded as a user-friendly handling of the cooking container, is achieved and a layout design with high cooking efficiency is achieved.

For example, as for specific use aspects of the automatic cooking-container-conveying device of the present invention, the automatic cooking-container-conveying device may be incorporated in various automatic food-serving systems that automatically serve food as long as the cooking-container-holding unit that is transferred by a conveying unit can convey the cooking container to a plurality of conveyance positions.

Specifically, the automatic cooking-container-conveying device may be incorporated in an automatic pasta-dish-serving system, may be incorporated in an automatic fried food serving system, or may be incorporated in an automatic food serving system that automatically provides cooked food using frozen food materials as well as refrigerated food materials and food materials at room temperature or the like, such as an automatic salad dish serving system that automatically serves a salad prepared by mixing refrigerated cut vegetables.

Meanwhile, as for specific use aspects of the cooking-container-holding unit of the present invention, the cooking-container-holding unit may displace, in accordance with the cooking operation, the cooking container by lifting and lowering, rotating, or turning, and may be used as a device that automates part of the cooking process, separately from the cooking process line without any problem.

As for the pair of upper and lower container-holding parts in the cooking-container-holding unit of the present invention, only the lower-side container-holding part may include a circumferential-wall-abutting portion and an outer-circumferential-surface-abutting portion, or only the upper-side container-holding part may include the circumferential-wall-abutting portion and the outer-circumferential-surface-abutting portion. The pair of upper and lower container-holding parts may each include the circumferential-wall-abutting portion and the outer-circumferential-surface-abutting portion.

As for a specific container form of the cooking container used in the cooking-container-holding unit and the automatic cooking-container-conveying device of the present invention, the cooking container may have a cylindrical container body, and an annular circumferential wall portion extending at least in one of an upward direction and a downward direction from a flange part that is provided on a container outer circumferential surface of the container body.

For example, the annular circumferential wall portion may extend in each of the upper and lower directions from a circumferential edge of the flange part, so that the flange part and the annular circumferential wall portion may jointly have a T-shaped cross section, or in consideration of weight reduction of the cooking container, the annular circumferential wall portion may extend at least in one of the upper direction and the lower direction from the circumferential edge of the flange part, so that the flange part and the annular circumferential wall portion may jointly have an L-shaped cross section.

In addition, as for the specific form of the container body, the container body may have a container bottom with an inverted cone-shape or a stockpot shape without any inconvenience as long as a cylindrical container outer circumferential surface and an annular circumferential wall portion is provided to an outer circumferential section of the container outer circumferential surface through the flange part.

It is preferable that the cooking container includes the flange part and the annular circumferential wall portion over the entire circumference of the container outer circumferential surface of the cylindrical container body so that the cooking container can be held in a cantilever manner in any circumferential direction of the cooking container. However, in consideration of weight reduction and instantaneous drying of the cooking container, one of the flange part and the annular circumferential wall portion may be provided over the entire container outer circumferential surface, and the other may be dispersed along the container outer circumferential surface.

In the present invention, although the positional relationship of the pair of container-holding parts is defined by the upper and lower directions, the positional relationship of the pair of container-holding parts is not limited to the upper and lower directions, and the positional relationship changes from time to time depending on the orientation of the cooking container to be held. For example, when the cooking container is reversed upside down so that an upper opening of the cooking container faces downward, an upper-side container-holding part becomes the lower side, and a lower-side container-holding part becomes the upper side.

Embodiments of the cooking-container-holding unit and the automatic cooking-container-conveying device of the present invention will be described below with reference to the accompanying drawings.

In the following description, the components denoted by the same reference signs in different drawings may be regarded as the same components, and the description thereof may be omitted.

The cooking-container-holding unit and the automatic cooking-container-conveying device of the embodiments of the present invention will be described with reference to FIGS. 1 to 7 as shown below.

Figure 2:
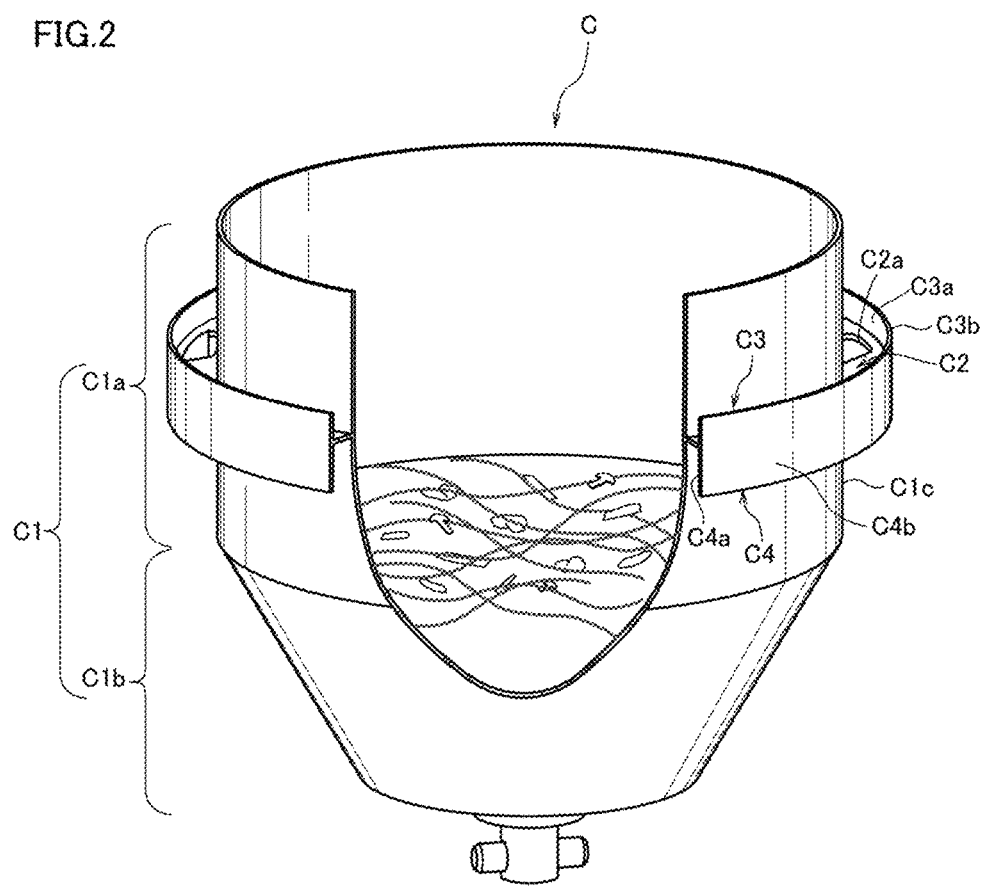
FIG. 2 is a schematic view of a partially cut-away cooking container used in the automatic cooking-container-conveying device shown in FIG. 1.
Figure 3A:
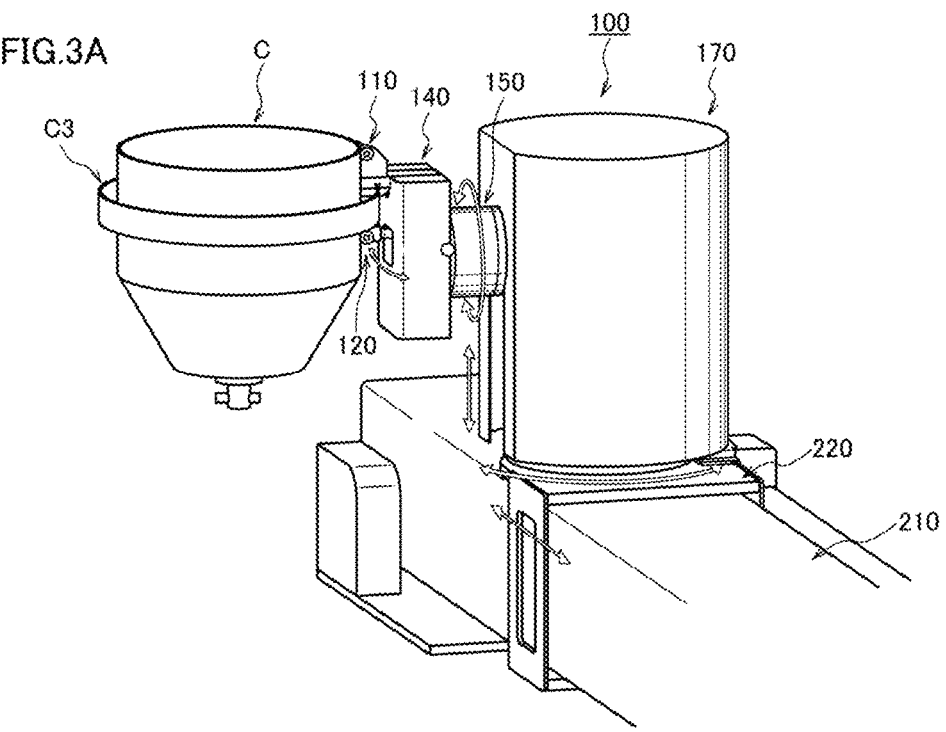
FIG. 3A is a perspective view of a cooking-container-holding unit in the automatic cooking-container-conveying device shown in FIG. 1.
Figure 3B:
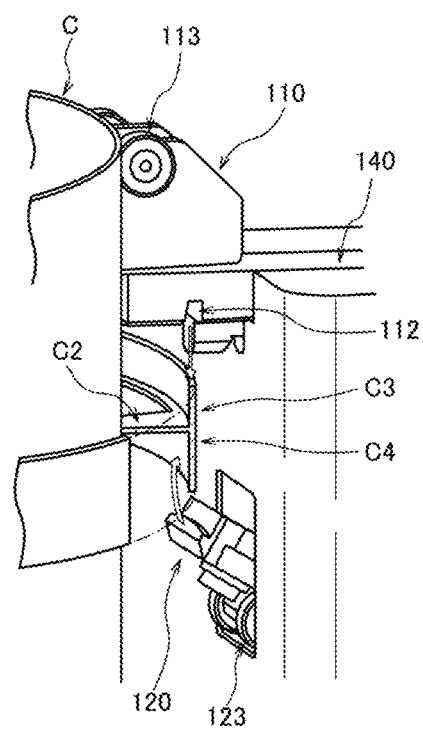
FIG. 3B is an enlarged view of a container-holding part of the cooking-container-holding unit and the cooking container.
Figure 4:
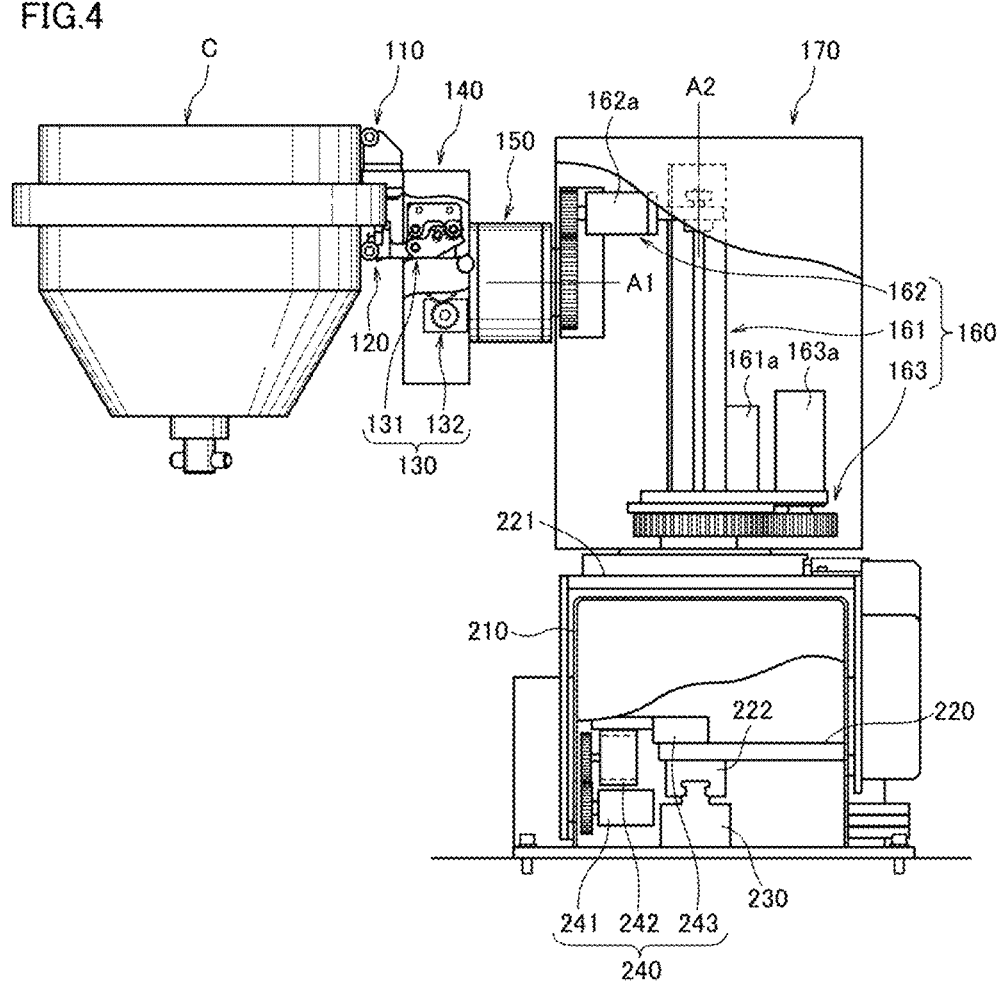
FIG. 4 is a schematic view showing a device configuration of the cooking-container-holding unit.
Figure 5A:
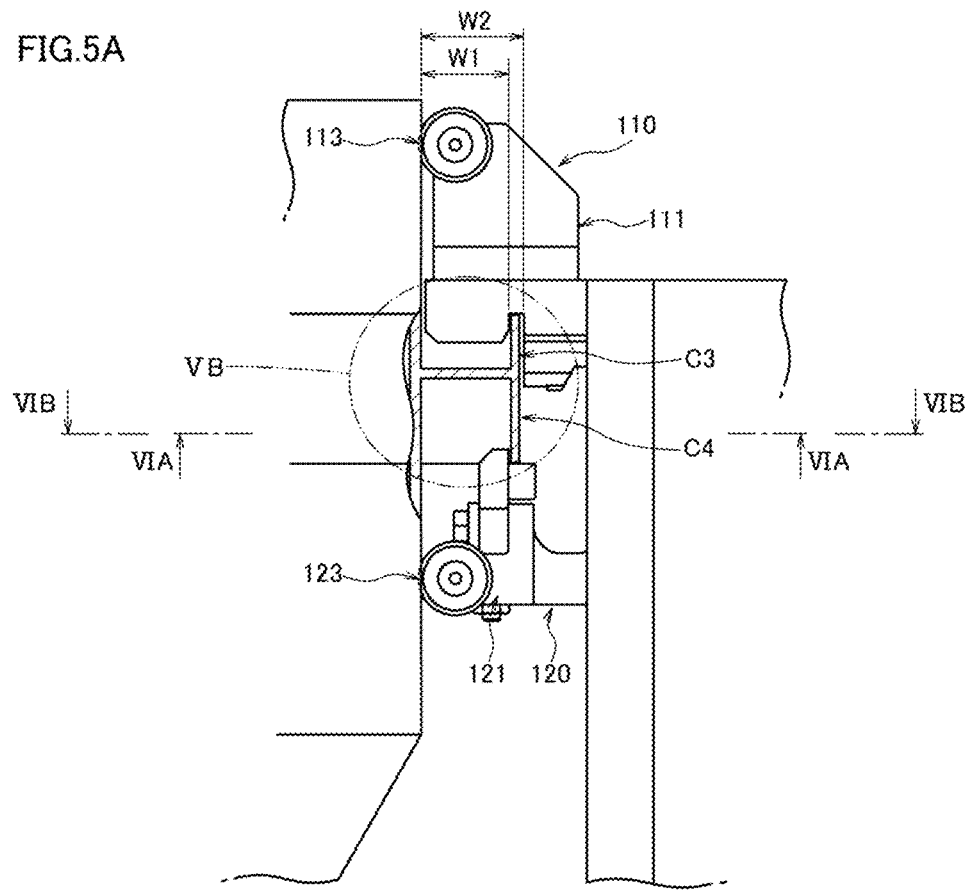
FIG. 5A is an enlarged view of a pair of upper and lower container-holding parts of the cooking-container-holding unit shown in FIG. 4.
Figure 5B:
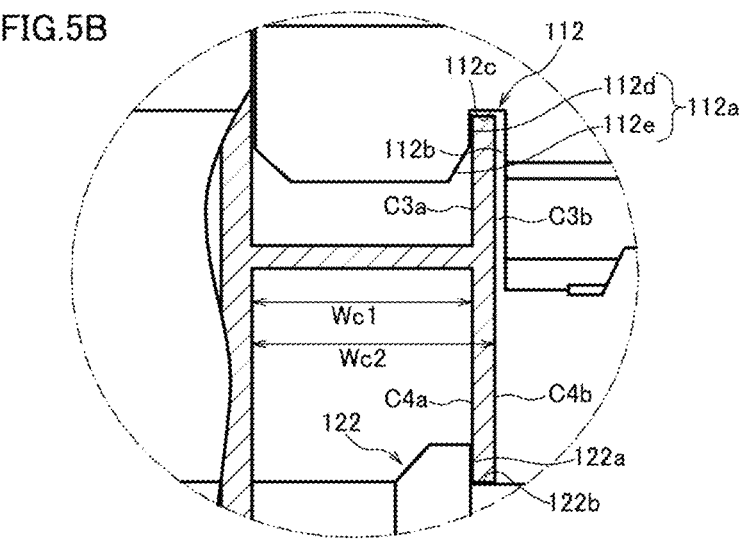
FIG. 5B is an enlarged view of a VB portion shown in FIG. 5A.
Figure 6A:
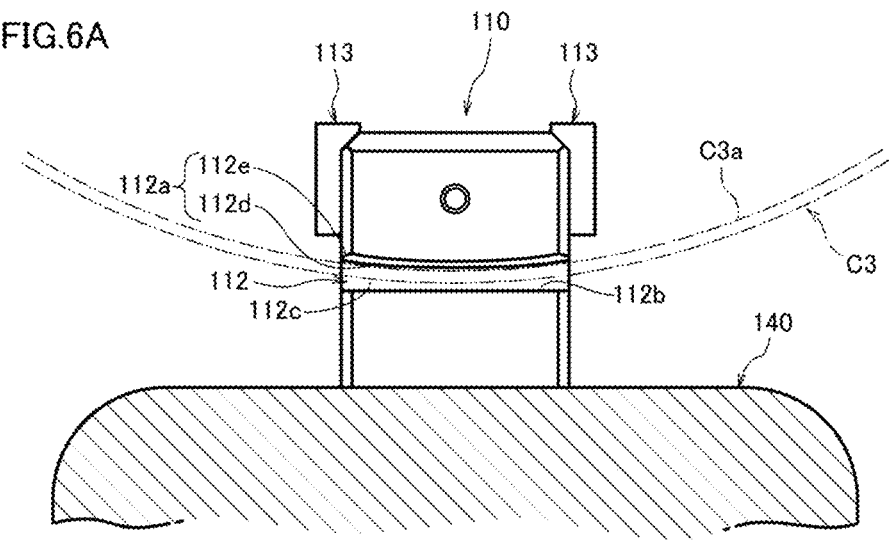
FIG. 6A is an enlarged view of the container-holding part viewed along line VIA-VIA in FIG. 5A.
Figure 6B:
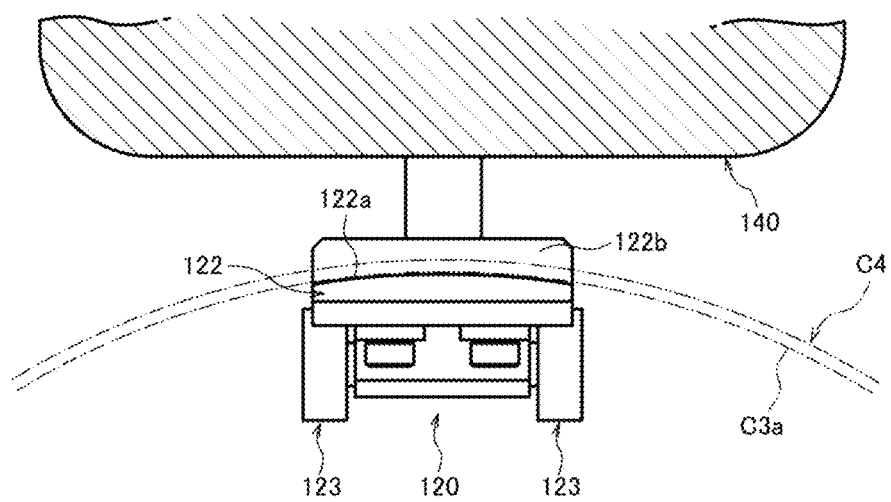
FIG. 6B is an enlarged view of the container-holding part viewed along line VIB-VIB in FIG. 5A.

Here, FIG. 1 is a perspective view showing a use aspect of an automatic cooking-container-conveying device as an embodiment of the present invention. FIG. 2 is a schematic view of a partially cut-away cooking container used in the automatic cooking-container-conveying device shown in FIG. 1. FIG. 3A is a perspective view of a cooking-container-holding unit in the automatic cooking-container-conveying device shown in FIG. 1. FIG. 3B is an enlarged view of a container-holding part of the cooking-container-holding unit and the cooking container. FIG. 4 is a schematic view showing a device configuration of the cooking-container-holding unit. FIG. 5A is an enlarged view of a pair of upper and lower container-holding parts of the cooking-container-holding unit shown in FIG. 4. FIG. 5B is an enlarged view of a VB portion shown in FIG. 5A. FIG. 6A is an enlarged view of the container-holding part viewed along line VIA-VIA in FIG. 5A. FIG. 6A is an enlarged view of the container-holding part viewed along line VIB-VIB in FIG. 5A. FIG. 7A is an explanatory view of the operation of a toggle mechanism used in the cooking-container-holding unit. FIG. 7B is an explanatory view of the operation of the toggle mechanism used in the cooking-container-holding unit.

<Outline of Automatic Cooking-Container-Conveying Device 1>

First, an automatic cooking-container-conveying device 1 that is an embodiment of the present invention is incorporated into, for example, an automatic pasta-dish-serving system that automatically cooks and serves pasta to a customer in response to an order of the customer.

Thus, the automatic cooking-container-conveying device 1 of the embodiment of the present invention to be incorporated into the automatic pasta-dish-serving system includes a cooking container C configured to receive a food material so that the food material is freely stored, a cooking-container-holding unit 100 that displaces, in accordance with cooking operation, the cooking container C that is held in a cantilever manner such as lifting and lowering, rotating, or turning, a transfer unit 200 configured to transfer the cooking-container-holding unit 100 to various conveyance positions along a cooking process line, and a control unit 300 configured to drive and control the cooking-container-holding unit 100 and the transfer unit 200.

Therefore, in the automatic pasta-dish-serving system, when the cooking-container-holding unit 100 of an embodiment of the present invention conveys the cooking container C to conveyance positions corresponding to each device used for the pasta dish, a series of cooking steps for the pasta dish is performed by carrying out heating cooking, dishing-up processing, or washing processing using the cooking container C at the respective conveyance positions.

More specifically, a frozen noodle supply device (illustration omitted), which is incorporated into the automatic pasta-dish-serving system to perform refrigerating storage and automatic supply of frozen noodle blocks, supplies a frozen noodle block, and a noodle receiving device (illustration omitted) receives the frozen noodle block and boils the noodle through a boiler (illustration omitted).

Meanwhile, as shown in FIG. 1, the cooking-container-holding unit 100 that is an embodiment of the present invention holds the cooking container C, which contains pasta ingredients fed from an ingredient supply device D4 and is temporarily placed at an ingredient supply position (P1), in a cantilever manner and conveys the cooking container C to a noodle receiving position (P2).

Then, when the noodle receiving device feeds the boiled noodle into the cooking container C at the noodle receiving position (P2), the cooking-container-holding unit 100 that is an embodiment of the present invention conveys the cooking container C sequentially to a heating cooking position (P3) where a heating cooking device D5 is disposed, a dishing-up position (P4) where a dishing-up device (illustration omitted) is disposed, and then a washing position (P5) where a washing device D7 is disposed.

Thus, the cooking-container-holding unit 100 conveys the cooking container C to the conveyance positions corresponding to respective devices related to the pasta dish, and a series of cooking steps for the pasta dish is performed by carrying out heating cooking by the heating cooking device D5, dishing-up processing by the dishing-up device, or washing processing by the washing device D7 at the respective conveyance positions.

Here, the cooking-container-holding unit 100 that is an embodiment of the present invention allows the cooking container C that is conveyed to the respective conveyance positions to be displaced, in accordance with cooking operation, to a different height position in terms of the vertical direction by vertical lifting and lowering, an oblique orientation or a vertically reversed orientation by rotation, or a different position on the horizontal plane by turning via the cooking-container-holding unit 100.

Thus, when the cooking-container-holding unit 100 that is an embodiment of the present invention conveys the cooking container C to the washing position, and then conveys the cooking container C again to the ingredient supply position (P1), a series of cooking steps for the pasta dish described above is repeatedly performed.

<Regarding Specific Configuration of Cooking Container C>

Next, as shown in FIG. 2, the cooking container C, which is made of stainless steel and is used in the cooking-container-holding unit 100 as an embodiment of the present invention, includes a cylindrical container body C1 configured to receive a food material so that the food material is freely stored, and also includes annular circumferential wall portions C3 and C4 extending in upper and lower directions from a circumferential edge of a flange part C2 that is provided on a container outer circumferential surface C1c of the container body C1. Herein, the annular circumferential wall portions C3 and C4 are concentric with the container body C1.

In the annular circumferential wall portion, an upper portion is called an upper annular circumferential wall portion C3 and a lower portion is called a lower annular circumferential wall portion C4.

Here, although the cooking container C is preferably made of stainless steel in consideration of handling in heating cooking, washing or the like, the cooking container C may be made of a metal material other than stainless steel, such as aluminum.

The container body C1 of the cooking container C includes a cylindrical-barrel part C1a with an opened upper part, and a reverse-truncated-cone-shaped-bottom part C1b having an inner diameter gradually reduced toward the bottom surface and being continuous to the lower side of the cylindrical-barrel part C1a.

In the cooking container C, the flange part C2 and the annular circumferential wall portions C3 and C4 jointly form a lateral T-shaped cross section.

Furthermore, the flange part C2 of the cooking container C has a plurality of through holes C2a formed so as to be dispersed in a circumferential direction, so that weight reduction of the container can be achieved. In addition, when, for example, the cooking container C is washed by a washing device of the automatic pasta-dish-serving system, water droplets of the washing water are discharged through the through holes C2a, so that water droplets are less likely to remain in the flange part C2.

The flange part C2 may be provided so as to protrude toward the container outer circumferential surface C1c in the horizontal direction or to protrude at an angle in the horizontal direction.

In other words, the configuration of the through holes C2a of the flange part C2, such as the form, dimensions, number, or the angle of inclination, may be adjusted as appropriate in consideration of the drainage performance of water droplets, for example.

Note that the annular circumferential wall portions C3 and C4 described before are provided over the entire container outer circumferential surface C1c of the container Body C1.

<Regarding Specific Configuration of Cooking-Container-Holding Unit 100>

Next, as shown in FIGS. 3A to 4, the cooking-container-holding unit 100 in an embodiment of the present invention includes a pair of upper and lower container-holding parts 110 and 120 that abut against part of the annular circumferential wall portions C3 and C4 and the container outer circumferential surface C1c of the cooking container C to hold the cooking container C in a cantilever manner, a holding drive part 130 that operates the pair of upper and lower container-holding parts 110 and 120, and a container displacement drive part 160 that displaces, in accordance with cooking operation, the cooking container C held by the pair of upper and lower container-holding parts 110 and 120 in the cantilever manner.

As shown in FIG. 4, in the pair of upper and lower container-holding parts 110 and 120, the upper-side container-holding part 110 (hereinafter referred to as the "upper container-holding part") is a fixed side of holding and holding release operation, and the lower-side container-holding part 120 (hereinafter referred to as the "lower container-holding part") is a movable side of the holding and hold releasing operation.

The upper container-holding part 110 includes a circumferential-wall-abutting portion 112 that is abutted against the upper annular circumferential wall portion C3 of the cooking container C, and an outer-circumferential-wall-abutting portion 113 that is abutted against the container outer circumferential surface C1c of the cooking container C.

In other words, the circumferential-wall-abutting portion 112 is constituted of a container fitting groove 112 provided to an upper holding body 111 of the upper container-holding part 110 so that an upper section of the upper annular circumferential wall portion C3 of the cooking container C is fitted into a groove wall surface 112a from above and the groove wall surface 112a is allowed to abut against the upper annular circumferential wall portion C3.

The container fitting groove 112 formed as the circumferential-wall-abutting portion 112 has an arc-shaped groove wall surface 112d on the side facing an inner circumferential surface C3a of the upper annular circumferential wall portion C3, the arc-shaped groove wall surface 112c having an arc shape identical in curvature radius to the inner circumferential surface C3a.

More specifically, the container fitting groove 112 includes a pair of groove wall surfaces 112a and 112b that are arranged to be facing both the radial surfaces of the upper annular circumferential wall portion C3 of the cooking container C, and also includes the groove wall surface 112c constituting the bottom surface of the groove wall surfaces 112a and 112b.

In the pair of groove wall surfaces 112a and 112b, the groove wall surface 112a includes an arc-shaped groove wall surface 112d, which is arranged to be facing the arc-shaped inner circumferential surface C3a that is on the inner side of the radial direction of the upper annular circumferential wall portion C3 while the pair of upper and lower container-holding parts 110 and 120 holds the cooking container C in a cantilever manner, and a groove-inside guiding surface 112e, which is provided at the entrance of the container fitting groove 112 to guide the upper annular circumferential wall portion C3 to a fitting completion position on a depth side of the groove.

The arc-shaped groove wall surface 112d of the container fitting groove 112 forms a depth-side region of the one groove wall surface 112a of the container fitting groove 112, and the inner circumferential surface C3a of the upper annular circumferential wall portion C3, which has been fitted into the container fitting groove 112, is disposed facing the arc-shaped groove wall surface 112d.

In addition, the groove-inside guiding surface 112e is provided so as to be inclined in a section extending from the entrance of the container fitting groove 112 to the depth-side position of the groove where the arc-shaped groove wall surface 112d is formed so that the groove-inside guiding surface 112e is provided to maximize the groove width at the entrance.

The groove wall surface 112b facing the groove wall surface 112a, where the arc-shaped groove wall surface 112d is formed, is formed in the shape of a straight line as shown in FIG. 6A.

The thus configured container fitting groove 112 is formed so as to be freely fitted with the upper annular circumferential wall portion C3 of the cooking container C.

The outer circumferential surface-abutting portion 113 is a roller that rotatably abuts against the container outer circumferential surface C1c of the cooking container C and is provided so as to be pushed out from the upper part of the upper holding body 111 to the side facing the cooking container C.

The lower container-holding part 120 includes a push-in piece 122, and an outer-circumferential-wall-abutting portion 123 that is abutted against the container outer circumferential surface C1c of the cooking container C.

Furthermore, the push-in piece 122 includes an arc-shaped wall surface 122a provided to a lower holding body 121 that constitutes a body portion of the lower container-holding part 120, the arc-shaped wall surface 122a being disposed facing an inner circumferential surface C4a of the lower annular circumferential wall portion C4.

The lower container-holding part 120 forms a generally L-shaped surface with a holding surface 122b facing an end face of the lower annular circumferential wall portion C4 and with the arc-shaped wall surface 122a of the push-in piece 122.

The outer-circumferential-wall-abutting portion 123 of the lower container-holding part 120 is a roller that is rotatably provided to the lower holding body 121 and is provided so as to be pushed out from the lower part of the lower holding body 121 to the side facing the cooking container C.

As shown in FIG. 4, the holding drive part 130 includes a toggle mechanism 131, and a rotary motor 132 as a drive source.

As shown in FIG. 7, the toggle mechanism 131 uses a four-node rotation link, which is constituted of four turning pairs 131a, 131b, 131c, and 131d, and four nodes 131e, 131f, 131g, and 131h.

In the toggle mechanism 131, the power from the rotary motor 132 is transmitted through a gear G to one node 131e, and another node 131h is coupled with the lower container-holding part 120 to transmit the power, which is transmitted from the rotary motor 132, to the lower container-holding part 120.

Thus, the lower container-holding part 120 receives the power transmitted from the rotary motor 132 by the toggle mechanism 131 and turns around one turning pair 131a of the toggle mechanism 131, so as to be movable along an arc-shaped trajectory between a container holding position and a container holding release position.

Then, the pair of upper and lower container-holding parts 110 and 120 and the holding drive part 130 are supported by a holding-part-support body 140, and the holding-part-support body 140 is connected to the container displacement drive part 160 through an arm-shaped part 150.

Thus, the container displacement drive part 160 displaces, in accordance with cooking operation, the cooking container C held in a cantilever manner with the pair of upper and lower container-holding parts 110 and 120.

As shown in FIG. 4, the container displacement drive part 160 includes a lifting drive mechanism 161 constituted of, for example, a lifting cylinder that includes a lifting rotary motor 161a serving as a drive source for lifting-lowering movement of the holding-part-support body 140, a drive mechanism 162 for rotation including a rotary motor 162a serving as a drive source for rotating the holding-part-support body 140 around a rotary shaft A1 in the horizontal direction, and a turning drive mechanism 163 configured to turn the cooking container C held by the pair of upper and lower container-holding parts 110 and 120 to a different position on the horizontal plane.

The drive mechanism 162 for rotation is coupled with the holding-part-support body 140 through the arm-shaped part 150.

The drive mechanism 162 for rotation that is coupled with the holding-part-support body 140 is also coupled with the lifting drive mechanism 161 so as to be freely lifted and lowered.

As a result, the holding-part-support body 140 is freely lifted and lowered together with the drive mechanism 162 for rotation by the lifting drive mechanism 161, and is freely rotated at a lowering completed position and a lifting completed position or a height position therebetween by the drive mechanism 162 for rotation.

The turning drive mechanism 163 includes a turning rotary motor 163a serving as a drive source for turning the holding-part-support body 140 on the horizontal plane.

More specifically, the turning drive mechanism 163 supports the lifting drive mechanism 161, which is coupled with the drive mechanism 162 for rotation, from the bottom side so that the lifting drive mechanism 161 freely rotates around a vertical rotary shaft A2, and turns the holding-part-support body 140 around the vertical rotary shaft A2 with the driving force of the turning rotary motor 163a.

The lifting drive mechanism 161, the drive mechanism 162 for rotation, and the turning drive mechanism 163 are incorporated into a unit body 170, and the unit body 170 is provided on a later-described slider 220 of the transfer unit 200.

As shown in FIG. 3A, the thus configured cooking-container-holding unit 100 of the present embodiment has total four movable shafts, including a movable shaft to perform holding and holding release operation of the pair of upper and lower container-holding parts 110 and 120, a movable shaft to rotate the holding-part-support body 140 around a horizontal axis, a movable shaft to lift and lower the holding-part-support body 140, and a movable shaft to turn the holding-part-support body 140.

<Regarding Specific Configuration of Transfer Unit 200>

The transfer unit 200 transfers the cooking-container-holding unit 100 to a plurality of conveyance positions P1 to P5 (see FIG. 1) of the cooking container. The transfer unit 200 includes, as shown in FIG. 4, a transfer guide frame 210 provided so as to extend in a transfer direction of the cooking-container-holding unit 100, the slider 220 slidably provided on the transfer guide frame 210 in the transfer direction, a guide rail 230 provided inside the transfer guide frame 210 so as to extend in the transfer direction to guide the slider 220 movably in the transfer direction, and a slider drive part 240 that moves the slider 220 in the transfer direction.

The transfer guide frame 210 is provided, for example, on a base B, and incorporates various parts of the transfer unit 200, i.e., the guide rail 230 and the slider drive part 240.

The slider 220 includes a unit mounting table 221 for mounting the cooking-container-holding unit 100, and a rail coupling portion 222 that engages with a protruding portion provided to a side part of the guide rail 230 in the transfer direction and slidably coupled with the guide rail 230.

The slider drive part 240 includes a rotary motor 241 serving as a drive source, a drive belt 242 hang over between a drive gear connected to the rotary motor 241 and a driven gear (illustration omitted) provided so as to be separated from the drive gear in the transfer direction, and a metal coupler 243 that couples the drive belt 242 with the slider 220.

In the thus configured transfer unit 200, the rotary motor 241 of the slider drive part 240 is driven to rotate the drive belt 242, so that the slider 220 coupled with the drive belt 242 through the metal coupler 243 moves along the guide rail 230.

When the slider 220 moves in this way, the cooking-container-holding unit 100 mounted on the slider 220 is transferred to a transfer position corresponding to each device related to the pasta dish.

<Configuration of Automatic Pasta-Dish-Serving System Incorporating Automatic Cooking-Container-Conveying Device 1>

Next, the configuration of the automatic pasta-dish-serving system incorporating the automatic cooking-container-conveying device 1 will be described with reference to FIG. 8.

Figure 8:
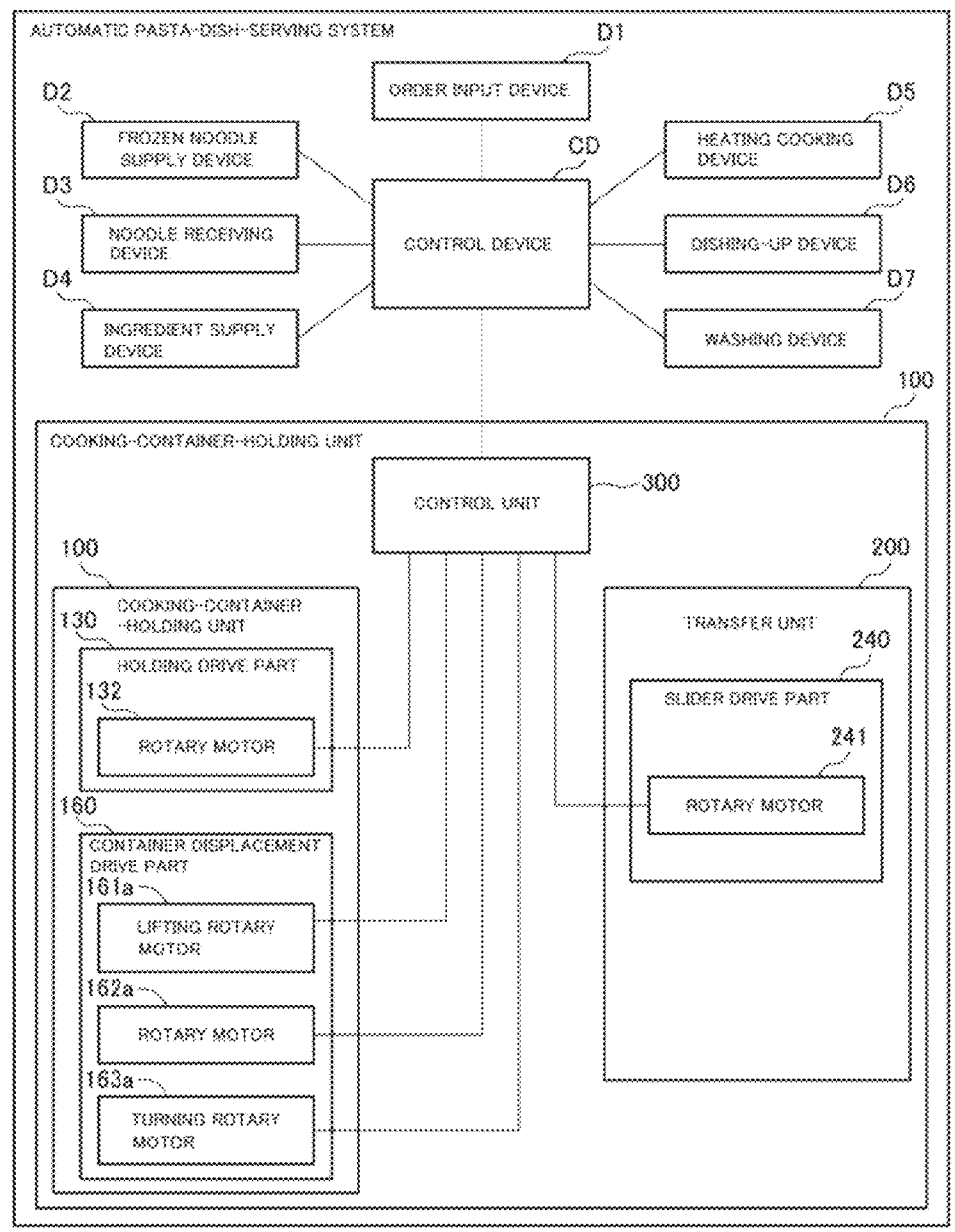
FIG. 8 is a configuration diagram of an automatic pasta-dish-serving system incorporating the automatic cooking-container-conveying device of the present invention.

Here, FIG. 8 is a configuration diagram of the automatic pasta-dish-serving system.

As shown in FIG. 8, the automatic pasta-dish-serving system includes a control device CD, and the control device CD comprehensively controls the entire automatic pasta-dish-serving system.

The control device CD is connected via a control line to each control unit (illustration omitted) of, for example, an order input device D1, a frozen noodle supply device D2, a noodle receiving device D3, the ingredient supply device D4, a heating cooking device D5, a dishing-up device D6, and the washing device D7.

The control device CD is also connected to the control unit 300 that controls the automatic cooking-container-conveying device 1, and the control unit 300 controls the cooking-container-holding unit 100 and the transfer unit 200 on the basis of a command signal from the control device CD, so as to automatically execute a series of cooking for pasta dishes using the cooking container C in the automatic pasta-dish-serving system.

The control unit 300 is connected to the respective drive sources of the cooking-container-holding unit 100 and the transfer unit 200 via drivers.

More specifically, the control unit 300 is connected to a rotary motor 132 serving as a drive source of the holding drive part 130, the lifting rotary motor 161a, the rotary motor 162a, and the turning rotary motor 163a serving as drive sources of the container displacement drive part.

The control unit 300 described above is connected to the rotary motor 241 of the slider drive part 240 in the transfer unit 200.

<Regarding Specific Operation of Cooking-Container-holding unit 100>

First, the operation of the cooking container C held by the pair of upper and lower container-holding parts 110 and 120 of the cooking-container-holding unit 100 in a cantilever manner will be described with reference to FIG. 1.

As described above, the cooking-container-holding unit 100 conveys the cooking container C using the transfer unit 200 to the ingredient supply position (P1), the noodle receiving position (P2), the heating cooking position (P3), the dishing-up position (P4), and the washing position (P5).

The cooking-container-holding unit 100 displaces the cooking container C, which is conveyed to each position by the cooking-container-holding unit 100, to a position or orientation corresponding to cooking performed by each device.

For example, in the ingredient supply position (P1) (see FIG. 1), the cooking container C is mounted at the ingredient supply position (P1) so that the ingredients of the pasta are supplied into the cooking container C from the ingredient supply device D4.

Here, the cooking-container-holding unit 100 moves the holding-part-support body 140 downward to mount the cooking container C at the ingredient supply position (P1).

At the time of downward movement of the holding-part-support body 140, the cooking container C tends to move so that the upper region of the container outer circumferential surface C1c is away from or closer to the upper container-holding part 110. However, since the upper annular circumferential wall portion C3 of the cooking container C abuts against the circumferential-wall-abutting portion 112 of the cooking-container-holding unit 100, and the container outer circumferential surface C1c of the cooking container C abuts against the outer-circumferential-surface-abutting portions 113 and 123 of the cooking-container-holding unit 100, rattling is suppressed.

In the state where the holding-part-support body 140 completes movement to the lowered position, the cooking container C tends to incline so that the upper region of the container outer circumferential surface C1c is away from the upper container-holding part 110 by its own weight. However, the inclination is suppressed by the circumferential-wall-abutting portion 112 and the outer-circumferential-wall-abutting portion 123.

In particular, the lower-side outer-circumferential-wall-abutting portion 123 effectively prevents the cooking container C from inclining to make the container outer circumferential surface C1c become closer to the lower container-holding part 120.

In the lifting operation of the holding-part-support body 140, the rattling and inclination of the cooking container C is similarly suppressed.

For example, in the washing position (P5) (see FIG. 1), in order to wash the cooking container C by injecting washing water into the cooking container C that is reversed upside down with its opening facing downward, the cooking-container-holding unit 100 rotates the holding-part-support body 140 around the shaft A1 in the horizontal direction so as to reverse the cooking container C upside down.

At the time of rotating operation of the holding-part-support body 140, the cooking container C tends to move so that the upper region of the container outer circumferential surface C1c is away from or closer to the upper container-holding part 110. However, since the upper annular circumferential wall portion C3 of the cooking container C abuts against the circumferential-wall-abutting portion 112 of the cooking-container-holding unit 100, and the container outer circumferential surface C1c of the cooking container C abuts against the outer-circumferential-surface-abutting portions 113 and 123 of the cooking-container-holding unit 100, rattling is suppressed.

In the state where the holding-part-support body 140 has been reversed, the cooking container C tends to incline so that the upper region of the container outer circumferential surface C1c is closer to the upper container-holding part 110 by its own weight. However, the inclination is suppressed by the circumferential-wall-abutting portion 112 and the outer-circumferential-wall-abutting portion 113.

In particular, the upper-side outer-circumferential-wall-abutting portion 113 effectively prevents the cooking container C from inclining to make the container outer circumferential surface C1c become closer to the upper container-holding part 110.

For example, in turning operation of the holding-part-support body 140 at the ingredient supply position (P1) (see FIG. 1), even when the cooking container C is swung in a turning direction to move, the inner circumferential surface C3a of the upper annular circumferential wall portion C3 of the cooking container C abuts against the arc-shaped groove wall surface 112c of the container fitting groove 112. As a result, the rattling in the turning direction that is likely to occur in the cooking container C is prevented.

Such inclination and rattling of the cooking container C can be prevented similarly when the transfer unit 200 transfers the cooking-container-holding unit 100 to each conveyance position, including the ingredient supply position (P1), the noodle receiving position (P2), the heating cooking position (P3), the dishing-up position (P4), and the washing position (P5).

Next, the holding operation and the holding release operation of the cooking container C by the pair of upper and lower container-holding parts 110 and 120 of the cooking-container-holding unit 100 will be described with reference to FIGS. 9A and 9B.

Figure 9B:
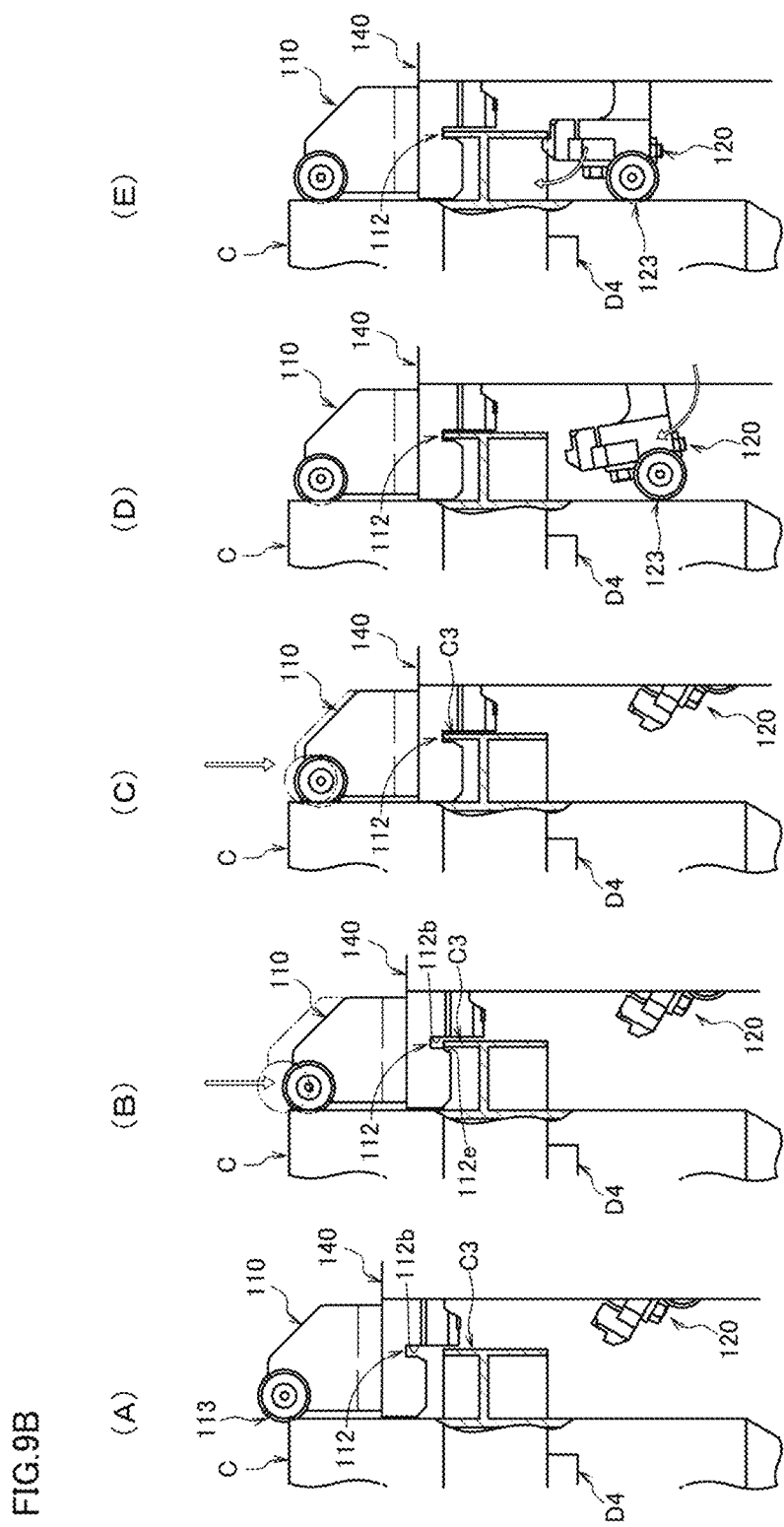
FIG. 9B is an explanatory view of the procedure for holding the cooking container by a pair of upper and lower container-holding parts.

Here, FIG. 9A is an explanatory view of positioning operation when the cooking container C is mounted on the cooking-container-holding unit 100, and FIG. 9B is an explanatory view of the procedure for holding the cooking container C by the pair of upper and lower container-holding parts 110 and 120.

For example, in order to supply the ingredients of the pasta into the cooking container C from the ingredient supply device D4 at the ingredient supply position (P1), the cooking-container-holding unit 100 releases the holding of the cooking container C and mounts the cooking container C at the ingredient supply position (P1).

Then, the cooking-container-holding unit 100 holds the cooking container C containing the ingredient supplied from the ingredient supply device D4 in a cantilever manner, and transfers the cooking container C to the noodle receiving position (P2).

In short, at the ingredient supply position (P1), the cooking-container-holding unit 100 performs holding and holding release operation of the cooking container C.

First, the operation to hold the cooking container C mounted at the ingredient supply position (P1) by the cooking-container-holding unit 100 will be described.

The cooking-container-holding unit 100 puts the pair of upper and lower container-holding parts 110 and 120 in a holding release state, i.e., in a released state, and performs positioning operation of the cooking container C so that the upper annular circumferential wall portion C3 of the cooking container C can be fitted into the container fitting groove 112 of the upper container-holding part 110.

The positioning operation of the cooking container C by the cooking-container-holding unit 100 is as shown in FIG. 9A, for example. The turning drive mechanism 163 turns the holding-part-support body 140 around the vertical rotary shaft A2, so that the outer-circumferential-surface-abutting portion 113 provided to the upper container-holding part 110 abuts against the container outer circumferential surface C1c of the cooking container C mounted at the ingredient supply position (P1), so that the cooking container C is positioned at a position where the pair of upper and lower container-holding parts 110 and 120 can hold the cooking container C.

When the cooking container C is mounted at a displaced position on the ingredient supply device D4 in the positioning operation of the cooking container C by the cooking-container-holding unit 100, the cooking container C is pushed by the upper-side outer-circumferential-surface-abutting portion 113 of the cooking-container-holding unit 100 to be positioned at a specified position.

In the present embodiment, the pair of upper and lower container-holding parts 110 and 120 abut against any portion of the container outer circumferential surface C1c of the cooking container C and the upper annular circumferential wall portion C3 over the entire container outer circumferential surface C1c to hold the cooking container C in a cantilever manner.

Accordingly, the pair of upper and lower container-holding parts 110 and 120 can hold the cooking container C regardless of the direction of the cooking container C in the circumferential direction. Therefore, when the pair of upper and lower container-holding parts 110 and 120 hold the cooking container C, the cooking-container-holding unit 100 does not need to perform positioning operation of the cooking container C in the circumferential direction.

The cooking-container-holding unit 100 is positioned at a position where the cooking container C can be held. When the outer-circumferential-surface-abutting portion 113 abuts against the container outer circumferential surface C1c at the positioned position, the holding-part-support body 140 is at a height position where the upper annular circumferential wall portion C3 is not inserted into the container fitting groove 112 (see (A) of FIG. 9B). After such positioning is performed, the holding-part-support body 140 is moved downward, so that the upper annular circumferential wall portion C3 is fitted into the container fitting groove 112, which is provided to the upper container-holding part 110, from above (see (B) and (C) of FIG. 9B).

In this case, even when the cooking container C has some dimensional variations or the cooking container C is slightly inclined, the groove-inside guiding surface 112e of the container fitting groove 112 guides the upper annular circumferential wall portion C3 from the entrance of the groove to the fitting completion position on the depth side of the groove (see (B) of FIG. 9B).

The surface continuously extending downward from the groove wall surface 112b of the container fitting groove 112 is made to function as a surface that is abutted against the upper annular circumferential wall portion C3 of the cooking container C.

Since the container fitting groove 112 of the upper container-holding part 110 is formed so as to be freely fitted with the upper annular circumferential wall portion C3 of the cooking container C, the upper annular circumferential wall portion C3 is easily fitted into the container fitting groove 112.

In this way, the upper annular circumferential wall portion C3 is fitted into the container fitting groove 112 of the upper container-holding part 110 (see (C) of FIG. 9B), and thereby both the radial surfaces of the upper annular circumferential wall portion C3 are disposed facing the pair of the groove wall surfaces 112a and 112b, respectively.

In particular, the inner circumferential surface C3a of the upper annular circumferential wall portion C3 is disposed facing the arc-shaped groove wall surface 112c of the container fitting groove 112.

Since the upper-side outer-circumferential-surface-abutting portion 113 is a roller, the holding-part-support body 140 rotates and smoothly moves the roller downward while keeping the state of abutting against the container outer circumferential surface C1c of the cooking container C.

After the upper annular circumferential wall portion C3 of the cooking container C is fitted into the container fitting groove 112 of the upper container-holding part 110, the cooking-container-holding unit 100 starts turning the lower container-holding part 120 from the container holding release position to the container holding position (see (D) of FIG. 9B).

Here, the lower container-holding part 120 turns while the lower-side outer-circumferential-wall-abutting portion 123, which is a roller, is smoothly abutted against the container outer circumferential surface C1c of the cooking container C. As a result, the lower container-holding part 120 is prevented from turning while shaving off the container outer circumferential surface C1c of the cooking container C.

Finally, the lower container-holding part 120 turns to the container holding position of the cooking container C. As a result, the holding operation of the cooking container C by the pair of upper and lower container-holding parts 110 and 120 is completed (see (E) of FIG. 9B).

Once the holding operation of the cooking container C by the pair of upper and lower container-holding parts 110 and 120 is completed, the outer-circumferential-wall-abutting portion 123 of the lower container-holding part 120 presses the container outer circumferential surface C1c of the cooking container C from the lower side. As a result, the upper annular circumferential wall portion C3 of the cooking container C abuts against the groove wall surface of the container fitting groove 112, that is, the arc-shaped groove wall surface 112d, and the container outer circumferential surface C1c of the cooking container C abuts against the outer-circumferential-surface-abutting portions 113 and 123 provided to the upper container-holding part 110 and the lower container-holding part 120, respectively.

The container fitting groove 112 is formed so as to be freely fitted with the upper annular circumferential wall portion C3 of the cooking container C. However, when the cooking container C is inclined, the upper and lower outer-circumferential-surface-abutting portions 113 and 123 abut against the container outer circumferential surface C1c of the cooking container C, so that the inclination is adjusted. As a result, the distance between the upper annular circumferential wall portion C3 and the container fitting groove 112, and the inclination of the upper annular circumferential wall portion C3 in the container fitting groove 112 are adjusted, and thereby the inner circumferential surface C3a of the upper annular circumferential wall portion C3 is pressed against the arc-shaped groove wall surface 112d with a play present between an outer circumferential surface C3b and the groove wall surface 112b. In addition, the inner circumferential surface C4a of the lower annular circumferential wall portion C4 is pressed against the arc-shaped wall surface 122a.

The lower container-holding part 120 does not have a wall on the side facing the push-in piece 122, where the wall will cause the lower container-holding part 120 to get caught in the lower section of the lower annular circumferential wall portion C4 at the time of turning along an arc-shaped trajectory of movement with one turning pair 131a of the toggle mechanism 131 as a rotation center.

Therefore, the lower container-holding part 120 is turned smoothly without being caught in the cooking container C.

Once the holding operation of the cooking container C by the pair of upper and lower container-holding parts 110 and 120 is completed, the container outer circumferential surface C1c of the cooking container C is pressed from the lower side by the outer-circumferential-wall-abutting portion 123 of the lower container-holding part 120. As a result, the upper annular circumferential wall portion C3 of the cooking container C abuts against the arc-shaped groove wall surface 112d of the container fitting groove 112, and the container outer circumferential surface C1c of the cooking container C abuts against the outer-circumferential-surface-abutting portions 113 and 123 provided to the upper container-holding part 110 and the lower container-holding part 120, respectively.

The container fitting groove 112 is formed so as to be freely fitted with the upper annular circumferential wall portion C3 of the cooking container C. However, the upper and lower outer-circumferential-surface-abutting portions 113 and 123 abut against the container outer circumferential surface C1c of the cooking container C. As a result, the distance between the upper annular circumferential wall portion C3 and the container fitting groove 112, and the inclination of the upper annular circumferential wall portion C3 in the container fitting groove 112 are adjusted, and the upper section of the upper annular circumferential wall portion C3 allows a play of the container fitting groove 112 and abuts against the groove wall surface.

Here, W1 is the distance from an edge part of the upper-side outer-circumferential-surface-abutting portion 113 to the groove wall surface 112a of the container fitting groove 112. W2 is the distance from the edge part of the upper-side outer-circumferential-surface-abutting portion 113 to the groove wall surface 112b of the container fitting groove 112. Wc1 is the distance from the container outer circumferential surface C1c to the inner circumferential surface C3a of the upper annular circumferential wall portion C3. Wc2 is the distance from the container outer circumferential surface C1c to the outer circumferential surface of the upper annular circumferential wall portion C3. For example, as shown in FIG. 5, the dimensional relation is adjusted so that the following expression is satisfied:

$$W1 \leq Wc1 < Wc2 \leq W2 \qquad \text{(Expression 1)}$$

In FIG. 5, Wc2 and W2 satisfy Wc2<W2 to provide an appropriate play between the outer circumferential surface C3b and the groove wall surface 112b. Although the range of the play is not particularly limited, the thickness of the flange part C2 and the upper annular circumferential wall portion C3 is 1.2 mm in the present embodiment, while the play between the outer circumferential surface C3b and the groove wall surface 112b is set to 1.3 to 2.4 mm, for example.

Moreover, the container fitting groove 112 of the upper container-holding part 110 has the arc-shaped groove wall surface 112d on the side facing the inner circumferential surface C3a of the upper section of the upper annular circumferential wall portion C3 of the cooking container C, where the arc-shaped groove wall surface 112d is identical in curvature radius to the inner circumferential surface C3a. When the dimensional accuracy of the cooking container C is increased, it is also possible to bring the inner circumferential surface C3a of the upper annular circumferential wall portion C3 into surface contact with the arc-shaped groove wall surface 112d. Even when the dimensional accuracy of the cooking container C varies, point contact or line contact involving at least two points is possible. Therefore, the cooking-container-holding unit 100 can stably hold the cooking container C regardless of the dimensional accuracy.

Next, the holding release operation of the cooking container C at the ingredient supply position (P1) by the cooking-container-holding unit 100 will be described.

The holding release operation of the cooking container C by the cooking-container-holding unit 100 is the opposite of the holding operation described before.

Specifically, the cooking-container-holding unit 100 transferred by the transfer unit 200 to the ingredient supply position (P1) is lowered to a height position where the cooking container C can be mounted at the ingredient supply position (P1).

Here, the cooking-container-holding unit 100 lowers the holding-part-support body 140 to the height position where the cooking container C can be mounted at the ingredient supply position (P1) (see (E) of FIG. 9B).

Then, the cooking-container-holding unit 100 turns the lower container-holding part 120 from the container holding position to the container holding release position (see (D) of FIG. 9B).

Here, the lower container-holding part 120 turns to the container holding release position while abutting the lower-side outer-circumferential-wall-abutting portion 123 against the container outer circumferential surface C1c of the cooking container C.

This makes it possible to prevent the lower container-holding part 120 from turning while shaving off the container outer circumferential surface C1c of the cooking container C.

Since the outer-circumferential-wall-abutting portion 123 is also a roller as in the case of the upper-side outer-circumferential-wall-abutting portion 113, it is possible to smoothly press the outer-circumferential-wall-abutting portion 123 to the container outer circumferential surface C1c of the cooking container C while rotating the outer-circumferential-wall-abutting portion 123.

Moreover, the lower container-holding part 120 does not have a wall on the side facing the push-in piece 122, where the wall will cause the lower container-holding part 120 to get caught in the lower section of the lower annular circumferential wall portion C4 at the time of turning. Therefore, this makes it possible to perform the holding release operation of the cooking container C by the pair of upper and lower container-holding parts 110 and 120 smoothly without getting caught in the cooking container C.

When the lower container-holding part 120 turns to the container holding release position (see (C) of FIG. 9B), there is no support for supporting the cooking container C from below. As a result, the cooking container C moves downward by its own weight (see (B) of FIG. 9B) and is mounted at the ingredient supply position (P1) (see (A) of FIG. 9B).

<Effects Demonstrated by Cooking-Container-Holding Unit 100 and Automatic Cooking-Container-Conveying Device 1 Incorporating Same as Embodiments of Present Invention>

The effects of the cooking-container-holding unit 100 in the present embodiment as described above are as follows.

(1) A cooking-container-holding unit 100 that is an embodiment of the present embodiment is configured to hold a cooking container C in a cantilever manner regardless of its orientation in a circumferential direction, the cooking container C being constituted of a cylindrical container body C1 configured to receive a food material so that the food material is freely stored, and annular circumferential wall portions C3 and C4 that have a lateral T-shaped cross section, that extend in upper and lower directions from a flange part C2 that is provided on a container outer circumferential surface C1c of the container body C1, and that are concentric with the container body C1. In order to do so, the cooking-container-holding unit 100 includes: a pair of an upper container-holding part 110 and a lower container-holding part 120 that sandwich the annular circumferential wall portions C3 and C4 of the cooking container C and abut against the container outer circumferential surface C1c of the cooking container C; and a holding drive part 130 configured to detachably hold the cooking container C in a cantilever manner with the upper container-holding part 110 and the lower container-holding part 120. Accordingly, when the cooking container C is held in a cantilever manner, the pair of the upper container-holding part 110 and the lower container-holding part 120, operated by the holding drive part 130, abut against the annular circumferential wall portion C3 of the cooking container C and the container outer circumferential surface C1c, which is separated from the annular circumferential wall portion C3 in a vertical direction and in a radial direction of the container C. As a result, the container-holding parts share an eccentric load caused by the weight of the cooking container C itself. As compared with a conventional grip member, which grips in a cantilever manner by supporting the entire weight of the cooking container with only the annular circumferential wall portion of the cooking container, the cooking container C is positioned and held more reliably with the annular circumferential wall portion C3 and the container outer circumferential surface C1c of the cooking container C. As a result, it is possible to suppress rattling in terms of vertical orientation of the cooking container C. Such rattling is likely to occur, for example, in a washing process because of the cooking container C being displaced when the vertical orientation of the cooking container C is reversed around a shaft center of the cooking container in a cantilever state and the bottom of the container is on the upper side. By suppressing this, stable displacement operation of the cooking container C can be implemented.

Since a container displacement drive part 160 is provided to displace, in accordance with cooking operation, the cooking container C that is held by the holding drive part 130, both the power sources of the holding drive part 130 and the container displacement drive part 160 can be downsized. Accordingly, space saving of the cooking-container-holding unit 100 can be achieved, and the range of displacing the cooking container C can be expanded.

(2) The upper container-holding part 110 includes a container fitting groove 112 in which the upper annular circumferential wall portion C3 of the cooking container C is fitted in a loosely fitted state, and the lower container-holding part 120 includes an outer-circumferential-surface-abutting member configured to abut against the container outer circumferential surface C1c of the cooking container C. Accordingly, when the upper annular circumferential wall portion C3 of the cooking container C is fitted into the container fitting groove 112 in the container-holding part 110, and the outer-circumferential-surface-abutting member 123 of the lower container-holding part 120 is pressed to the container outer circumferential surface C1c of the cooking container C, a so-called three-point support state is achieved in which the upper annular circumferential wall portion C3 of the cooking container C leans against a pair of groove wall surfaces 112a and 112b that form the inside of the container fitting groove 112 and obliquely abut against the respective groove wall surfaces at two points, and also the container outer circumferential surface C1c of the cooking container C abuts against the outer-circumferential-surface-abutting member 123. Therefore, when the cooking container C is held with the pair of the upper container-holding part 110 and the lower container-holding part 120, it is possible to keep a cantilever state where the upper annular circumferential wall portion C3 and the container outer circumferential surface C1c of the cooking container C are reliably positioned and engaged.

The upper container-holding part 110 also includes the container fitting groove 112 into which the upper annular circumferential wall portion C3 of the cooking container C is fitted in a loosely fitted state. Therefore, when the cooking container C is mounted on the cooking-container-holding unit 100, a gap required for mounting the container is ensured to allow the upper annular circumferential wall portion C3 of the cooking container C to be in the state of being loosely fitted into the container fitting groove 112 of the upper container-holding part 110. As a result, it becomes easy to fit the upper annular circumferential wall portion C3 of the cooking container C into the container fitting groove 112, and it becomes possible to achieve simple mounting operation for the cooking container C.

Furthermore, the container fitting groove 112 of the upper container-holding part 110 described above is constituted of an arc-shaped groove wall surface 112d that is concentric with the upper annular circumferential wall portion C3 of the cooking container C. Because of this arrangement, relative misalignment between the upper annular circumferential wall portion C3 of the cooking container C and the container fitting groove 112 of the upper container-holding part 110 is suppressed even if centrifugal force by the turning is generated by the upper annular circumferential wall portion C3 of the cooking container C being in surface contact with the container fitting groove 112 of the upper container-holding part 110 when the cooking container C is displaced to turn in the horizontal plane in accordance with cooking operation, and thereby. Therefore, when the cooking container C is displaced so as to turn in the horizontal plane in accordance with cooking operation, the rattling of the cooking container C in the turning direction in the container-holding part 110 can be eliminated. Also, the operation speed required for the turning displacement during cooking can be further increased, while the rattling of the cooking container can be suppressed even with the turning speed increased.

(3) The lower container-holding part 120 includes the outer-circumferential-surface-abutting member 123 made of a roller configured to abut against the container outer circumferential surface C1c of the cooking container C, and a push-in piece 122 configured to push a lower annular circumferential wall portion C4 of the cooking container C upward from a lower side. Because of this arrangement, when the cooking container C is mounted on the cooking-container-holding unit 100, the push-in piece 122 pushes the upper annular circumferential wall portion C3 of the cooking container C, which has been fitted into the container fitting groove 112 of the upper container-holding part 110, upward from the lower side so as to prevent the upper annular circumferential wall portion C3 of the cooking container C from accidentally dropping from the container fitting groove 112 of the upper container-holding part 110. Furthermore, the outer-circumferential-surface-abutting member 123 made of a roller is smoothly pressed to the container outer circumferential surface C1c of the cooking container C. This effect allows the cooking-container-holding unit 100 to reliably mount the cooking container C so as to prevent the cooking container C from accidentally dropping from the container fitting groove 112 of the upper container-holding part 110.

(4) The holding drive part 130 has a toggle mechanism 131 that is coupled with the push-in piece 122, so that the driving force from the drive source is amplified and transmitted to the lower-side container-holding part 120 that is a movable side. Because of this arrangement, the driving force obtained from the drive source can be amplified to a large holding force by the pair of the upper container-holding part 110 and the lower container-holding part 120. As a result, the size of a drive source, such as a motor, can be reduced and the device can be downsized.

(5) The effects demonstrated by the automatic cooking-container-conveying device 1 incorporating the cooking-container-holding unit 100 as an embodiment of the present invention are as follows.

Specifically, the automatic cooking-container-conveying device 1 as an embodiment of the present invention includes: the cooking-container-holding unit 100 described above; a transfer unit 200 configured to transfer the cooking-container-holding unit 100; and a control unit 300 configured to drive and control the cooking-container-holding unit 100 and the transfer unit 200. Here, the transfer unit 200 is provided along the cooking process line. Accordingly, the cooking-container-holding unit abuts against the upper annular circumferential wall portion C3 and the container outer circumferential surface C1c of the cooking container C to share an eccentric load due to the weight of the cooking container C itself and to hold the cooking container in a cantilever manner. For example, in the washing process, the vertical orientation of the cooking container C is reversed around a shaft center of the cooking container C in a cantilever state so that the bottom of the container is on the upper side, and in the food supply device, the cooking container C is turned in the horizontal plane or lifted and lowered in a vertical direction, so that the transfer unit 200, which is driven and controlled by the control unit 300, efficiently transfers the cooking-container-holding unit 100 to various cooking positions arranged along the cooking process line. Therefore, rattling of the cooking container C, which is likely to occur when the vertical orientation of the cooking container C is reversed or when the cooking container C is turned in the horizontal plane, can be eliminated, while considerable reduction of the time required for vertical reversing operation, turning operation, and lifting-lowering operation of the cooking container C can be achieved. Moreover, in the cooking process line constituted of, for example, a noodle supply device, a boiler, a washing machine, a heating cooking device, a cooking container waiting part, a food material supply device, and a dishing-up device, quick and stable handling of the cooking container C, this handling being that generally regarded as a user-friendly handling C, can be achieved, and a layout design with high cooking efficiency can be achieved. Therefore, the effects of the automatic cooking-container-conveying device 1 are tremendous.

<Modifications>

The cooking-container-holding unit and the automatic cooking-container-conveying device according to the embodiments of the present invention have been described in the foregoing. However, the respective embodiments illustrate the cooking-container-holding unit and the automatic cooking-container-conveying device for embodying the technical concept of the present invention and are not intended to limit the present invention. Therefore, the technical concept of the present invention is equally applicable to other embodiments, and it is also possible to omit, add, or change some parts of these embodiments, and to combine respective aspects of the embodiments.

For example, in the embodiments described above, although the container fitting groove as the circumferential-wall-abutting portion is provided to the upper container-holding part, the container fitting groove may be provided to the lower container-holding part. In this case, the upper container-holding part may have a container fitting groove. However, when the gripping force can be ensured, the upper container-holding part may not have a container fitting groove.

In the embodiments described above, although the roller as the outer-circumferential-surface-abutting portion is provided to both the upper container-holding part and the lower container-holding part, the roller may be provided to any one of the upper container-holding part and the lower container-holding part.

For example, when the cooking container is not reversed upside down, the cooking container easily inclines so that the upper region of the container outer circumferential surface is away from the upper container-holding part, whereas the cooking container is not easily incline so that the upper region is closer to the upper container holding part. Therefore, the roller may be provided only to the lower container-holding part.

The outer-circumferential-surface-abutting portion may be constituted of part of the upper holding body or the lower holding body, other than the roller. For example, a protruding part may be provided in part of the upper holding body to constitute the outer-circumferential-surface-abutting portion.

In the embodiments described above, an example has been described in which the inner circumferential surface C3a of the upper annular circumferential wall portion C3 is in surface contact with the arc-shaped groove wall surface 112d. This configuration is effective only when the curvature of the inner circumferential surface C3a and the curvature of the arc-shaped groove wall surface 112d are exactly the same, and the present embodiment is not limited to the configuration. For example, when the curvature of the inner circumferential surface C3a is larger than the curvature of the arc-shaped groove wall surface 112d, they are in line contact with each other at one point. For example, when the curvature of the inner circumferential surface C3a is smaller than the curvature of the arc-shaped groove wall surface 112d, they are in line contact with each other at two points.

In the embodiments described above, although the width dimension of the container fitting groove 112 between the arc-shaped groove wall surfaces 112b and 112d has been described to be identical in any depth direction, the present embodiment is not limited to this. For example, the width dimension of the container fitting groove 112 may be narrower as the depth is deeper (as the arc-shaped groove wall surface 112c is closer). In this case, if the width dimension at the depth of the container fitting groove 112 is extremely narrow, the relationship in Expression 1 may not be established at a deeper position in the container fitting groove 112. Specifically, at a tip part of the upper annular circumferential wall portion C3, the following expression may be established:

$$W1 = Wc1 < Wc2 = W2 \qquad \text{(Expression 2)}$$

In a deeper portion, the following expression may be established:

$$Wc1 \leq W1 < W2 \leq Wc2 \qquad \text{(Expression 3)}$$

In the case of holding in a mode other than the surface contact, the annular circumferential wall portion can be allowed to abut against any portion of the groove wall surfaces of the arc-shaped groove wall surface. For example, the container fitting groove may be configured such that the space between the facing groove wall surfaces is formed narrower toward the inside of the groove, so that the tip part of the annular circumferential wall portion that has been fitted into the groove abuts against the facing groove wall surfaces at two points. When the upper annular circumferential wall portion C3 of the cooking container C is adjusted so as to abut against any portion of the groove wall surfaces 112a, 112b, and 112c at two points by the point contact or the line contact, the cooking container C can be held at three points, which is achieved by adding any one of the upper and lower outer-circumferential-surface-abutting portions 113 and 123, i.e., stable holding of the cooking container C by three-point support becomes possible. In FIG. 5a, the cooking container C is supported at two points by the pair of upper and lower outer-circumferential-surface-abutting portions 113 and 123. Accordingly, when the upper annular circumferential wall portion C3 of the cooking container C abuts against the groove wall surfaces 112a, 112b, and 112c of the container fitting groove 112 at least at one point, it is possible to support the cooking container C stably at three points.

In the present embodiment, it has been described that at the tip of the flange part C2, the upper annular circumferential wall portion C3 and the lower annular circumferential wall portion C4 are provided and that the annular circumferential wall portion is in an annular shape with a T-shaped cross section that is jointly formed with the flange part C2. However, the present embodiment is not limited to this configuration. The annular shape in the annular circumferential wall portion does not refer to a continuous annular shape, and may be an intermittent annular shape. In other words, the annular circumferential wall portion may have a hole, a notch, a void, or the like, provided therein. In addition to the upper annular circumferential wall portion C3 and the lower annular circumferential wall portion C4, the flange part C2 may also have a through hole C2a, a notch, a void, or the like, provided therein.

The cross section of the annular circumferential wall portion is not limited to the T-shaped cross section, and may be, for example, an L-shaped (an upward L-shaped and a downward L-shaped) cross section, a cross-shaped cross section, or the like. For example, the downward L-shaped cross section is formed of the flange part C2 and the lower annular circumferential wall portion C4 with the upper annular circumferential wall portion C3 being omitted in the annular circumferential wall portion of FIG. 2. In the case of such an annular circumferential wall portion with a downward L-shaped cross section, for example, a container fitting groove used for fitting and holding the lower annular circumferential wall portion C4 may be provided in the lower container-holding part 120, the lower container-holding part 120 may hold the lower annular circumferential wall portion C4 with the container fitting groove, and the lower outer-circumferential-surface-abutting member 123 may hold the container outer circumferential surface C1c of the cooking container C, so that the cooking container C can stably be held at three points. In this case, for example, the upper container-holding part 110 for holding the upper part of the flange part C2 may be provided and the upper surface of the flange part C2 is held by the lower surface of the upper container-holding part 110, so that the upper and lower outer-circumferential-surface-abutting members 123, the lower container-holding part 120, and the upper container-holding part 110 may hold the cooking container C. As a result, the cooking-container-holding unit 100 can stably hold the cooking container C even during orientation control of the cooking container C.

In the embodiments described above, the case where the circumferential-wall-abutting portion, which is abutted on the annular circumferential wall portion of the cooking container, is the container fitting groove has been illustrated. However, the circumferential-wall-abutting portion may be any member other than the groove, such as a container restraining wall to be provided to the lower container-holding part, as long as it is possible to abut against the cooking container at three points, together with the outer-circumferential-surface-abutting portion.

The invention claimed is:

1. A cooking-container-holding unit configured to hold a cooking container, the cooking container having a cylindrical container body configured to receive a food material so that the food material is freely stored and an annular circumferential wall portion that is concentric with the container body and extends at least in one of an upward direction and a downward direction from a flange part, which is provided on a container outer circumferential surface of the container body, the cooking-container-holding unit comprising:
a pair of upper and lower container-holding parts that sandwich the annular circumferential wall portion of the cooking container;
a holding drive part configured to detachably hold the cooking container in a cantilever manner with the pair of upper and lower container-holding parts; and
a container displacement drive part configured to displace, in accordance with cooking operation, the cooking container held by the holding drive part, wherein
at least a part of one of upper and lower container-holding parts freely abuts against the container outer circumferential surface of the cooking container,
one of the upper and lower container-holding parts includes a container fitting groove into which the annular circumferential wall portion of the cooking container is fitted in a loosely fitted state;
the other of the upper and lower container-holding parts includes a push-in piece configured to push the other side section of the annular circumferential wall portion of the cooking container toward the one side, and
at least a part of one of upper and lower container-holding parts is capable of contacting the outer surface of the cooking container.

2. The cooking-container-holding unit according to claim 1, wherein:
one of the upper and lower container-holding parts includes a container fitting groove into which the annular circumferential wall portion of the cooking container is fitted in a loosely fitted state; and
at least either the one or the other of the upper and lower container-holding parts includes an outer-circumferential-surface-abutting member configured to abut against the container outer circumferential surface of the cooking container.

3. The cooking-container-holding unit according to claim 1, wherein the container fitting groove of the container-holding part is constituted of an arc-shaped groove wall surface that is concentric with the annular circumferential wall portion of the cooking container.

4. The cooking-container-holding unit according to claim 1, wherein the other of the upper and lower container holding parts includes the outer-circumferential-surface-abutting member made of a roller configured to abut against the container outer circumferential surface of the cooking container, and a push-in piece configured to push a lower section of the annular circumferential wall portion of the cooking container upward from a lower side.

5. The cooking-container-holding unit according to claim 1, wherein the holding drive part has a toggle mechanism that is coupled with the push-in piece to amplify a driving force from a drive source.

6. An automatic cooking-container-conveying device comprising:
the cooking-container-holding unit according to claim 1;
a transfer unit configured to transfer the cooking container-holding unit; and
a control unit configured to drive and control the cooking-container-holding unit and the transfer unit, wherein the transfer unit is provided along a cooking process line.

7. A cooking-container-holding unit configured to hold a cooking container, the cooking container having a cylindrical container body configured to receive a food material so that the food material is freely stored and an annular circumferential wall portion that is concentric with the container body and extends at least in one of an upward direction and a downward direction from a flange part, which is provided on a container outer circumferential surface of the container body, the cooking-container-holding unit comprising:
a pair of upper and lower container-holding parts that sandwich the annular circumferential wall portion of the cooking container;
a holding drive part configured to detachably hold the cooking container in a cantilever manner with the pair of upper and lower container-holding parts; and
a container displacement drive part configured to displace, in accordance with cooking operation, the cooking container held by the holding drive part, wherein
at least a part of one of upper and lower container-holding parts freely abuts against the container outer circumferential surface of the cooking container,
one of the upper and lower container-holding parts includes a container fitting groove into which the annular circumferential wall portion of the cooking container is fitted in a loosely fitted state;
the other of the upper and lower container-holding parts includes a push-in piece configured to push the other side section of the annular circumferential wall portion of the cooking container toward the one side, and at least a part of one of upper and lower container-holding parts is capable of being inverted at least in the vertical direction.

8. The cooking-container-holding unit according to claim 7, wherein:
one of the upper and lower container-holding parts includes a container fitting groove into which the annular circumferential wall portion of the cooking container is fitted in a loosely fitted state; and
at least either the one or the other of the upper and lower container-holding parts includes an outer-circumferential-surface-abutting member configured to abut against the container outer circumferential surface of the cooking container.

9. The cooking-container-holding unit according to claim 7, wherein the container fitting groove of the container-holding part is constituted of an arc-shaped groove wall surface that is concentric with the annular circumferential wall portion of the cooking container.

10. The cooking-container-holding unit according to claim 7, wherein the other of the upper and lower container holding parts includes the outer-circumferential-surface-abutting member made of a roller configured to abut against the container outer circumferential surface of the cooking container, and a push-in piece configured to push a lower section of the annular circumferential wall portion of the cooking container upward from a lower side.

11. The cooking-container-holding unit according to claim 7, wherein the holding drive part has a toggle mechanism that is coupled with the push-in piece to amplify a driving force from a drive source.

12. An automatic cooking-container-conveying device comprising:
the cooking-container-holding unit according to claim 7;
a transfer unit configured to transfer the cooking container-holding unit; and
a control unit configured to drive and control the cooking-container-holding unit and the transfer unit, wherein the transfer unit is provided along a cooking process line.

* * * * *